(12) United States Patent
Peterson et al.

(10) Patent No.: US 10,100,187 B2
(45) Date of Patent: *Oct. 16, 2018

(54) METHOD FOR MAKING HETEROPHASIC POLYMER COMPOSITIONS

(71) Applicant: Milliken & Company, Spartanburg, SC (US)

(72) Inventors: Joseph J. Peterson, Simpsonville, SC (US); Scott R. Trenor, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,077

(22) Filed: Sep. 2, 2016

(65) Prior Publication Data

US 2017/0073511 A1    Mar. 16, 2017

Related U.S. Application Data

(60) Provisional application No. 62/217,957, filed on Sep. 13, 2015.

(51) Int. Cl.

| | |
|---|---|
| C08L 23/26 | (2006.01) |
| C08J 3/24 | (2006.01) |
| C08F 255/04 | (2006.01) |
| C08F 299/04 | (2006.01) |
| C08K 5/00 | (2006.01) |
| C08K 5/34 | (2006.01) |
| C08L 23/10 | (2006.01) |
| C08L 23/12 | (2006.01) |
| C08K 5/14 | (2006.01) |
| C08L 23/06 | (2006.01) |
| C08L 23/16 | (2006.01) |

(52) U.S. Cl.
CPC ............ *C08L 23/26* (2013.01); *C08F 255/04* (2013.01); *C08F 299/0457* (2013.01); *C08J 3/246* (2013.01); *C08K 5/0025* (2013.01); *C08K 5/14* (2013.01); *C08K 5/34* (2013.01); *C08L 23/06* (2013.01); *C08L 23/10* (2013.01); *C08L 23/12* (2013.01); *C08L 23/16* (2013.01); *C08L 2205/08* (2013.01)

(58) Field of Classification Search
CPC .......... C08L 23/12; C08L 23/16; C08L 23/06; C08L 23/26; C08L 2205/08; C08K 5/14; C08K 5/34; C08F 255/04; C08F 299/0457; C08J 3/246
See application file for complete search history.

(56) References Cited

U.S. PATENT DOCUMENTS

| | | |
|---|---|---|
| 3,301,837 A | 1/1967 | Bartorelli et al. |
| 3,376,304 A | 4/1968 | Mohrbacher et al. |
| 3,379,677 A | 4/1968 | Dressler et al. |
| 5,369,159 A | 11/1994 | Nesuadba |
| 5,428,162 A | 6/1995 | Nesuadba |
| 5,639,822 A | 6/1997 | Hungenberg et al. |
| 6,020,437 A | 2/2000 | Mestanza et al. |
| 6,620,892 B1 | 9/2003 | Bertin et al. |
| 6,992,225 B2 | 1/2006 | Grimaldi et al. |
| 7,019,086 B2 | 3/2006 | Onoi et al. |
| 7,196,144 B2 | 3/2007 | Ashiura et al. |
| 7,544,743 B2 | 6/2009 | Ciardelli et al. |
| 7,649,052 B2 | 1/2010 | Massari et al. |
| 7,772,325 B2 | 8/2010 | Ashiura et al. |
| 8,207,272 B2 | 6/2012 | Bernreitner et al. |
| 8,246,880 B2 | 8/2012 | Kawabe et al. |
| 8,557,926 B2 | 10/2013 | Kawazura et al. |
| 8,618,224 B2 | 12/2013 | Horst et al. |
| 9,410,035 B2 * | 8/2016 | Peterson et al. ........ C08L 23/26 |
| 2007/0145625 A1 | 6/2007 | Caronia et al. |
| 2007/0200272 A1 | 8/2007 | Horst et al. |
| 2010/0151156 A1 | 6/2010 | Kawabe et al. |
| 2010/0168343 A1 | 7/2010 | Harris et al. |
| 2011/0172368 A1 | 7/2011 | Stolz-Dunn |
| 2012/0289620 A1 | 11/2012 | Deheunynck et al. |
| 2015/0259453 A1 * | 9/2015 | Peterson et al. ........ C08L 23/10 525/375 |

(Continued)

FOREIGN PATENT DOCUMENTS

| | | |
|---|---|---|
| EP | 0 591 102 A1 | 9/1993 |
| EP | 1 354 901 B1 | 3/2006 |

(Continued)

OTHER PUBLICATIONS

PCT/US2016/050188 International Search Report, filed Sep. 2, 2016, 4 pages.
PCT/US2016/050188 Written Opinion of the International Searching Authority, filed Sep. 2, 2016, 4 pages.
Wan, Dong et al., "*Controlling Degradation and Branching Reactions of Polypropylene by Different Heteroaromatic Ring Derivatives*" Elsevier, Polymer Degradation and Stability 97 (2012) 40-48.
Xing, Haiping et al., "*Effect of Leaving Group in Dithiocarbamates on Mediating Melt Radical Reaction During Preparing Long Chain Branched Polypropylene*" Elsevier, Polymer 53 (2012) 947-955.
El-Sawy, Naeem M. et al., "*Electrical Properties of Modified-Grafted Polypropylene*"Journal of Applied Polymer Science, vol. 104, 3797-3803 (2207).

(Continued)

*Primary Examiner* — Nathan M Nutter
(74) *Attorney, Agent, or Firm* — Robert M. Lanning

(57) ABSTRACT

A method for modifying a heterophasic polymer composition comprises the steps of providing a compatibilizing agent, providing a heterophasic polymer composition comprising a propylene polymer phase and an ethylene polymer phase, mixing the compatibilizing agent and the heterophasic polymer composition, and generating free radicals in the propylene phase and the ethylene phase. At least a portion of the compatibilizing agent then reacts with free radicals in both the propylene polymer phase and the ethylene polymer phase to form a bond with a propylene polymer in the propylene polymer phase and a bond with an ethylene polymer in the ethylene polymer phase.

10 Claims, No Drawings

(56) References Cited

U.S. PATENT DOCUMENTS

| | | | | |
|---|---|---|---|---|
| 2016/0145426 A1* | 5/2016 | Peterson et al. | ....... | C08K 5/005 525/240 |
| 2016/0257810 A1* | 9/2016 | Peterson et al. | ........ | C08L 23/26 |

FOREIGN PATENT DOCUMENTS

| | | |
|---|---|---|
| EP | 1 391 482 B1 | 5/2009 |
| EP | 2 615 135 A1 | 7/2013 |
| WO | WO 2002/12204 A1 | 2/2002 |
| WO | WO 2007043358 A1 | 4/2007 |
| WO | WO 2010/009825 A1 | 1/2010 |
| WO | WO 2014/014491 A1 | 1/2014 |
| WO | WO 2015/138300 A1 | 9/2015 |

OTHER PUBLICATIONS

Hyslop, David K. et al., "*Functional Nitroxyls for Use in Delayed-Onset Polyolefin Cross-Linking*"Department of Chemical Engineering, Queen's University, Kingston, Ontario, Canada, Macromolecules 2012, 45, 8147-8154.

Al Sagheer, Fakhreia A. et al., "*Investigation of Radiation-Grafted and Radiation-Modified N-Vinyl-2-Pyrrolidone onto Polypropylene Film*" Chemistry Department, Faculty of Science, Kuwait University. Journal of Applied Polymer Science, vol. 76, 282-289 (2000).

Khalil, Magda M. I., et al., "*Gamma-Irradiation Effects on the Thermal and Structural Characteristics of Modified, Grafted Polypropylene*" Journal of Applied Polymer Science, vol. 102, 506-515 (2006).

Wan, Dong et al., *Preparation and Characterization of Long Chain Branched Polypropylene Mediated by Different Heteroaromatic Ring Derivatives*Elsevier, Polymer 54 (2013) 639-651.

Zulli, Fabio, et al., "*Rheology of Long-Chain Branched Polypropylene Copolymers*"Journal of Applied Polymer Science.

Sun, Fangli et al., "*Solid-State Graft Polymerization of Styrene in Spherical Polypropylene Granules in the Presence of TEMPO*"Journal of Applied Polymer Science, vol. 112, 275-282 (2009).

Augier, Sylvain, et al., *Structure and Rheology of Polypropylene with Various Architectures Prepared by Coagent-Assisted Radical Processing*Polym Int 2010; 59: 1499-1505.

Lee, Chun D., "*Structure-Property Relations in Visbroken (Peroxide Treated) Impact Polypropylene Copolymers*"Equistar Chemicals, A Lyondell Company.

* cited by examiner

METHOD FOR MAKING HETEROPHASIC POLYMER COMPOSITIONS

CROSS-REFERENCE TO RELATED PATENT APPLICATIONS

This application claims, pursuant to 35 U.S.C. § 119(e)(1), priority to and the benefit of the filing date of U.S. Patent Application No. 62/217,957 filed on Sep. 13, 2015, which application is hereby incorporated by reference in its entirety.

TECHNICAL FIELD OF THE INVENTION

The present invention is directed to heterophasic polyolefin compositions having increased melt flow rates, as well as high impact strength, and methods for making such compositions. Of particular interest are modified polypropylene impact copolymers.

BACKGROUND

The melt flow rate (MFR) of a polymer resin is a function of its molecular weight. In general, increasing the melt flow rate allows the resin to be processed at lower temperatures and to fill complex part geometries. Various prior art methods of increasing the melt flow rate involve melt-blending the resin in an extruder with a compound capable of generating free radicals, such as a peroxide. When this is done, the weight average molecular weight of the polymer is reduced and the MFR is increased. Increasing the melt flow rate by decreasing the molecular weight of the polyolefin polymer, however, has been found in many cases to have a detrimental effect on the strength of the modified polymer. For example, decreasing the molecular weight of the polymer can significantly lower the impact resistance of the polymer. And this lowered impact resistance can make the polymer unsuitable for use in certain applications or end uses. Accordingly, when extant technologies are utilized, one must strike a compromise between increasing the melt flow rate and undesirably decreasing the impact resistance of the polymer. This compromise often means that the melt flow rate is not increased to the desired level, which requires higher processing temperatures and/or results in lower throughputs.

A need therefore remains for additives and processes that can produce polymer compositions having an increased high melt flow while preserving, or even improving, the impact resistance of the polymer.

BRIEF SUMMARY OF THE INVENTION

In a first embodiment, the invention provides a method for modifying a heterophasic polymer composition, the method comprising the steps of:
(a) providing a compatibilizing agent, the compatibilizing agent comprising two or more functional groups capable of reacting with a free radical in a radical addition reaction;
(b) providing a heterophasic polymer composition, the heterophasic polymer composition comprising a propylene polymer phase and an ethylene polymer phase, and the heterophasic polymer composition having a number-average sequence length of ethylene runs of 3 or more;
(c) mixing the compatibilizing agent and the heterophasic polymer composition; and
(d) generating free radicals in the propylene polymer phase and the ethylene polymer phase, whereby at least a portion of the compatibilizing agent reacts with free radicals in both the propylene polymer phase and the ethylene polymer phase to form a bond with a propylene polymer in the propylene polymer phase and a bond with an ethylene polymer in the ethylene polymer phase.

DETAILED DESCRIPTION

The following definitions are provided to define several of the terms used throughout this application.

As used herein, the term "hydrocarbyl groups" refers to univalent functional groups derived from hydrocarbons by removal of a hydrogen atom from a carbon atom of the hydrocarbon.

As used herein, the term "substituted hydrocarbyl groups" refers to univalent functional groups derived from substituted hydrocarbons by removal of a hydrogen atom from a carbon atom of the substituted hydrocarbon. In this definition, the term "substituted hydrocarbon" refers to compounds derived from acyclic, monocyclic, and polycyclic, unbranched and branched hydrocarbons in which (1) one or more of the hydrogen atoms of the hydrocarbon is replaced with a non-hydrogen atom (e.g., a halogen atom) or a non-hydrocarbyl functional group (e.g., a hydroxy group or heteroaryl group) and/or (2) the carbon-carbon chain of the hydrocarbon is interrupted by an oxygen atom (e.g., as in an ether), a nitrogen atom (e.g., as in an amine), or a sulfur atom (e.g., as in a sulfide).

As used herein, the term "substituted alkyl groups" refers to univalent functional groups derived from substituted alkanes by removal of a hydrogen atom from a carbon atom of the alkane. In this definition, the term "substituted alkanes" refers to compounds derived from acyclic unbranched and branched hydrocarbons in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom (as in an ether), a nitrogen atom (as in an amine), or a sulfur atom (as in a sulfide).

As used herein, the term "substituted cycloalkyl groups" refers to univalent functional groups derived from substituted cycloalkanes by removal of a hydrogen atom from a carbon atom of the cycloalkane. In this definition, the term "substituted cycloalkanes" refers to compounds derived from saturated monocyclic and polycyclic hydrocarbons (with or without side chains) in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom, a nitrogen atom, or a sulfur atom.

As used herein, the term "alkenyl groups" refers to univalent functional groups derived from acyclic, unbranched and branched olefins (i.e., hydrocarbons having one or more carbon-carbon double bonds) by removal of a hydrogen atom from a carbon atom of the olefin.

As used herein, the term "substituted alkenyl groups" refers to univalent functional groups derived from acyclic, substituted olefins by removal of a hydrogen atom from a carbon atom of the olefin. In this definition, the term "substituted olefins" refers to compounds derived from acyclic, unbranched and branched hydrocarbons having one or more carbon-carbon double bonds in which (1) one or more of the hydrogen atoms of the hydrocarbon is replaced with a non-hydrogen atom (e.g., a halogen atom) or a non-alkyl functional group (e.g., hydroxy group, aryl group, heteroaryl group) and/or (2) the carbon-carbon chain of the hydrocarbon is interrupted by an oxygen atom (as in an ether) or a sulfur atom (as in a sulfide).

As used herein, the term "substituted cycloalkenyl groups" refers to univalent functional groups derived from substituted cycloalkenes by removal of a hydrogen atom from a carbon atom of the cycloalkene. In this definition, the term "substituted cycloalkenes" refers to compounds derived from monocyclic and polycyclic olefins (i.e., hydrocarbons having one or more carbon-carbon double bonds) in which one or more of the hydrogen atoms of the olefin is replaced with a non-hydrogen atom (e.g., a halogen atom) or a non-alkyl functional group (e.g., a hydroxy group, aryl group, or heteroaryl group).

As used herein, the term "substituted aryl groups" refers to univalent functional groups derived from substituted arenes by removal of a hydrogen atom from a ring carbon atom. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "substituted heteroaryl groups" refers to univalent functional groups derived from substituted heteroarenes by removal of a hydrogen atom from a ring atom. In this definition, the term "substituted heteroarenes" refers to compounds derived from monocyclic and polycyclic aromatic hydrocarbons in which (1) one or more of the hydrogen atoms of the hydrocarbon is replaced with a non-hydrogen atom (e.g., a halogen atom) or a non-alkyl functional group (e.g., a hydroxy group) and (2) at least one methine group (—C=) of the hydrocarbon is replaced by a trivalent heteroatom and/or at least one vinylidene group (—CH=CH—) of the hydrocarbon is replaced by a divalent heteroatom.

As used herein, the term "alkanediyl groups" refers to divalent functional groups derived from alkanes by removal of two hydrogen atoms from the alkane. These hydrogen atoms can be removed from the same carbon atom on the alkane (as in ethane-1,1-diyl) or from different carbon atoms (as in ethane-1,2-diyl).

As used herein, the term "substituted alkanediyl groups" refers to divalent functional groups derived from substituted alkanes by removal of two hydrogen atoms from the alkane. These hydrogen atoms can be removed from the same carbon atom on the substituted alkane (as in 2-fluoroethane-1,1-diyl) or from different carbon atoms (as in 1-fluoroethane-1,2-diyl). In this definition, the term "substituted alkanes" has the same meaning as set forth above in the definition of substituted alkyl groups.

As used herein, the term "cycloalkanediyl groups" refers to divalent functional groups derived from cycloalkanes (monocyclic and polycyclic) by removal of two hydrogen atoms from the cycloalkane. These hydrogen atoms can be removed from the same carbon atom on the cycloalkane or from different carbon atoms.

As used herein, the term "substituted cycloalkanediyl groups" refers to divalent functional groups derived from substituted cycloalkanes by removal of two hydrogen atoms from the cycloalkane. In this definition, the term "substituted cycloalkanes" has the same meaning as set forth above in the definition of substituted cycloalkyl groups.

As used herein, the term "cycloalkenediyl groups" refers to divalent functional groups derived from cycloalkenes (monocyclic and polycyclic) by removal of two hydrogen atoms from the cycloalkene. These hydrogen atoms can be removed from the same carbon atom on the cycloalkene or from different carbon atoms.

As used herein, the term "substituted cycloalkenediyl groups" refers to divalent functional groups derived from substituted cycloalkenes by removal of two hydrogen atoms from the cycloalkene. These hydrogen atoms can be removed from the same carbon atom on the cycloalkene or from different carbon atoms. In this definition, the term "substituted cycloalkenes" has the same meaning as set forth above in the definition of substituted cycloalkene groups.

As used herein, the term "arenediyl groups" refers to divalent functional groups derived from arenes (monocyclic and polycyclic aromatic hydrocarbons) by removal of two hydrogen atoms from ring carbon atoms.

As used herein, the term "substituted arenediyl groups" refers to divalent functional groups derived from substituted arenes by removal of two hydrogen atoms from ring carbon atoms. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "heteroarenediyl groups" refers to divalent functional groups derived from heteroarenes by removal of two hydrogen atoms from ring atoms. In this definition, the term "heteroarenes" refers to compounds derived from monocyclic and polycyclic aromatic hydrocarbons in which at least one methine group (—C=) of the hydrocarbon is replaced by a trivalent heteroatom and/or at least one vinylidene group (—CH=CH—) of the hydrocarbon is replaced by a divalent heteroatom.

As used herein, the term "substituted heteroarenediyl groups" refers to divalent functional groups derived from substituted heteroarenes by removal of two hydrogen atoms from ring atoms. In this definition, the term "substituted heteroarenes" has the same meaning as set forth above in the definition of substituted heteroaryl groups.

Unless otherwise indicated, conditions are 25° C., 1 atmosphere of pressure and 50% relative humidity, concentrations are by weight, and molecular weight is based on weight average molecular weight. The term "polymer" as used in the present application denotes a material having a weight average molecular weight ($M_w$) of at least 5,000. The term "copolymer" is used in its broad sense to include polymers containing two or more different monomer units, such as terpolymers, and unless otherwise indicated, includes random, block, and statistical copolymers. The concentration of ethylene or propylene in a particular phase or in the heterophasic composition is based on the weight of reacted ethylene units or propylene units relative to the total weight of polyolefin polymer in the phase or heterophasic composition, respectively, excluding any fillers or other non-polyolefin additives. The concentration of each phase in the overall heterogeneous polymer composition is based on the total weight of polyolefin polymers in the heterophasic composition, excluding any fillers or other non-polyolefin additives or polymers. In the structures of functional groups set forth below, the truncated bonds (i.e., the bonds truncated by the wavy lines) represent bonds to other portions of the compound containing the illustrated group.

In a first embodiment, the invention provides a method for modifying a heterophasic polymer composition. The method comprises the steps of (a) providing a compatibilizing agent, (b) providing a heterophasic polymer composition comprising a propylene polymer phase and an ethylene polymer phase, (c) mixing the compatibilizing agent and the heterophasic polymer composition, and (d) generating free radicals in the propylene polymer phase and the ethylene polymer phase. At least a portion of the compatibilizing agent then reacts with free radicals in both the propylene polymer phase and the ethylene polymer phase to form a bond with a propylene polymer in the propylene polymer phase and a bond with an ethylene polymer in the ethylene polymer phase.

The compatibilizing agent is an organic or organometallic compound comprising two or more functional groups capable of reacting with a free radical in a radical addition reaction (each such functional group can be hereinafter referred to as a "reactive functional group"). Suitable reactive functional groups for the compatibilizing agent include, but are not limited to, groups containing carbon-carbon multiple bonds (e.g., cyclic and acyclic carbon-carbon double bonds and carbon-carbon triple bonds), nitroxide radicals (including functional groups or moieties that form nitroxide radicals in situ during processing of the polymer), nitrones, and groups containing at least one tertiary carbon-hydrogen bond (e.g., a one tertiary carbon-hydrogen bond having a bond-dissociation energy of about 380 kJ/mol or less). Suitable examples of groups containing carbon-carbon multiple bonds include, but are not limited, vinyl groups, allyl groups, acrylate groups, and methacrylate groups. The compatibilizing agent can contain two or more of the same reactive functional group or more than one type of reactive functional group can be present on the compatibilizing agent.

In one preferred embodiment, the compatibilizing agent comprises a nitroxide radical or a functional group or moiety that forms a nitroxide radical during processing of the polymer. Examples of nitroxide compounds that can be used as the compatibilizing agent in the present invention can be found in *Synthetic Chemistry of Stable Nitroxides*, L. B. Volodarsky et al. CRC Press, Inc. (1994). The nitroxide compound can be a 5- or 6-membered heterocyclic compound, which can incorporate the nitroxide nitrogen in the ring structure. For example, the compatibilizing agent can be based on 2,2,6,6-tetramethyl-1-piperidinyloxy (TEMPO), such as the compounds of Formula (AI)-(AVII) below:

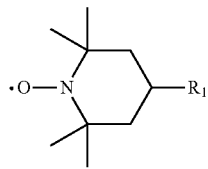

(AI)

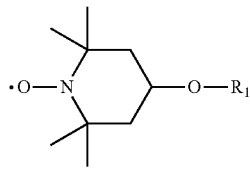

(AII)

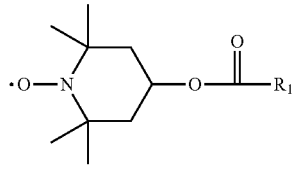

(AIII)

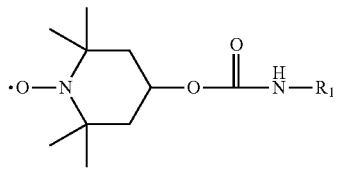

(AIV)

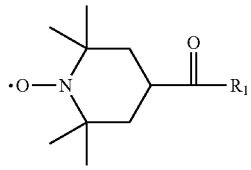

(AV)

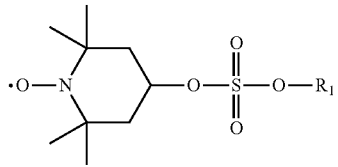

(AVI)

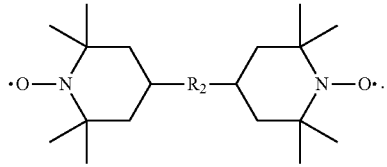

(AVII)

In the structures of Formulae (AI)-(AVI), $R_1$ is a functional group capable of reacting with a free radical in a radical addition reaction. Preferably, $R_1$ comprises an unsaturated carbon-carbon bond, such as a carbon-carbon double bond or a carbon-carbon triple bond. Suitable examples include but are not limited to aliphatic alkenyl groups and alkenyl substituted aromatic groups, such as phenyl. In another preferred embodiment, the alkenyl group is selected from the group consisting of $C_1$-$C_{10}$ alkenyl groups, more preferably $C_1$-$C_8$ alkenyl groups, $C_1$-$C_6$ alkenyl groups, or $C_1$-$C_4$ alkenyl groups. Specific examples of compounds conforming to one of Formulae (AI)-(AVI) and suitable for use as the compatibilizing agent include, but are not limited to, 4-(Methacryloyloxy)-2,2,6,6-tetramethylpiperidine-1-oxyl, ("TEMPO-Methacrylate"), 4-(Acryloyloxy)-2,2,6,6-tetramethylpiperidine-1-oxyl ("TEMPO-Acrylate"), and 4-[(4-vinylbenzyl)oxy]-2,2,6,6-tetramethylpiperidine-1-oxyl ("TEMPO-Styrene"). In the structure of Formula (AVII), $R_2$ is a divalent group linking the two TEMPO moieties. In one preferred embodiment, $R_2$ is a group of formula —O—(CH$_2$CH$_2$O)$_n$— where n is an integer equal to or greater than 1 (e.g., from 1 to 100). In a preferred embodiment, $R_2$ is a group conforming to the structure of Formula (AVIII) below

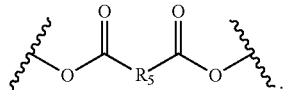

(AVIII)

In the structure of Formula (AVIII), $R_5$ is a divalent group selected from the group consisting of alkanediyl groups, substituted alkanediyl groups, cycloalkanediyl groups, substituted cycloalkanediyl groups, cycloalkenediyl groups, substituted cycloalkenediyl groups, arenediyl groups, and substituted arenediyl groups. Preferably, $R_5$ is selected from the group consisting of alkanediyl groups, cycloalkanediyl groups, and cycloalkenediyl groups. Specific examples of compounds conforming to the structure of Formula (AVII) and suitable for use as the compatibilizing agent include, but are not limited to, bis-(1-oxyl-2,2,6,6-tetramethylpiperidine-4-yl)sebacate and 4,4'-[bicyclo[2.2.1]hept-5-ene-2,3-diylbis(carbonyloxy)]bis(2,2,6,6-tetramethyl-1-piperidinyloxy).

As noted above, suitable reactive functional groups for the compatibilizing agent include carbon-carbon multiple bonds, preferably carbon-carbon double bonds. Thus, in another preferred embodiment, the compatibilizing agent is a compound comprising two or more carbon-carbon double bonds, preferably two or more acyclic carbon-carbon double bonds. Examples of compatibilizing agents incorporating multiple acyclic carbon-carbon double bonds include, but are not limited to, divinyl compounds (e.g., divinylbenzene), multifunctional acrylates, and acrylate salts of multivalent ions. General structures for such compatibilizing agents are set forth below. For example, the structure of Formula (AIX) depicts the general structure for suitable divinyl compounds

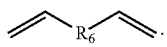
(AIX)

In the structure of Formula (AIX), $R_6$ is a divalent group selected from the group consisting of alkanediyl groups, substituted alkanediyl groups, cycloalkanediyl groups, substituted cycloalkanediyl groups, cycloalkenediyl groups, substituted cycloalkenediyl groups, arenediyl groups, substituted arenediyl groups, heteroarenediyl groups, and substituted heteroarenediyl groups. In a preferred embodiment, $R_6$ is selected from the group consisting of arenediyl groups and substituted arenediyl groups, with phendiyl being particularly preferred. The structure of Formula (AX) depicts the general structure for a multifunctional acrylate, specifically a diacrylate

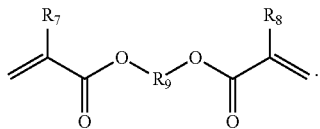
(AX)

In the structure of Formula (AX), $R_7$ and $R_8$ are independently selected from the group consisting of hydrogen and alkyl groups (e.g., methyl). $R_9$ is a divalent group selected from the group consisting of alkanediyl groups, substituted alkanediyl groups, cycloalkanediyl groups, substituted cycloalkanediyl groups, cycloalkenediyl groups, substituted cycloalkenediyl groups, arenediyl groups, substituted arenediyl groups, heteroarenediyl groups, and substituted heteroarenediyl groups. More preferably, $R_9$ is selected from the group consisting of alkanediyl groups, such as $C_1$-$C_8$ alkanediyl groups. One suitable example of such a diacrylate compound is butanediol dimethacrylate. The structure of Formula (AXI) depicts the general structure for acrylate salts suitable for use as the compatibilizing agent

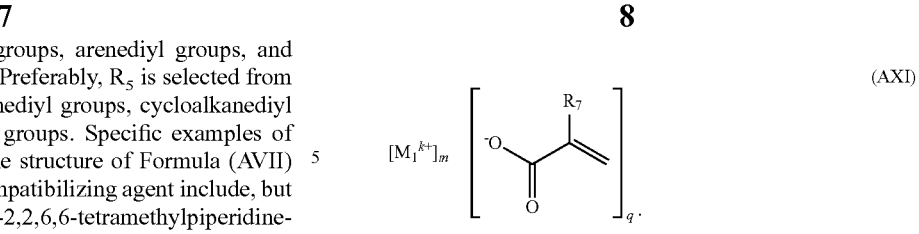
(AXI)

In the structure of Formula (AXI), $R_7$ is selected from the group consisting of hydrogen and alkyl groups (e.g., methyl). $M_1$ is a metal cation, and the variable k is the valence of the metal cation $M_1$ and is a positive integer equal to or greater than 2. The variable m is a positive integer equal to or greater than 1 and represents the number of metal cations $M_1$. The variable q is a positive integer equal to or greater than 2. The variables k, m, and q satisfy the following equation k·m=q. In a preferred embodiment, $M_1$ is selected from the group consisting of alkaline earth metals and transition metals (i.e., those elements classified in the d-block and f-block of the periodic table of elements). One example of an acrylate salt suitable for use as the compatibilizing agent is zinc dimethacrylate.

In another preferred embodiment, the compatibilizing agent is selected from the group consisting of compounds conforming to the structure of Formula (BI)

(BI)

In the structure of Formula (BI), $R_{51}$ is selected from the group consisting of aryl groups, substituted aryl groups, heteroaryl groups, substituted heteroaryl groups, and groups conforming to the structure of Formula (BV)

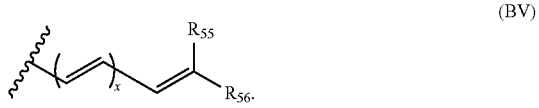
(BV)

In the structure of Formula (V), $R_{55}$ and $R_{56}$ are independently selected from the group consisting of hydrogen, alkyl groups, substituted alkyl groups, cycloalkyl groups, substituted cycloalkyl groups, aryl groups, substituted aryl groups, heteroaryl groups, and substituted heteroaryl groups or $R_{55}$ and $R_{56}$ can be combined to form a cyclic structure. The variable x is an integer selected from the group consisting of 0, 1, and 2. In a preferred embodiment, the variable x is 0, $R_{55}$ is hydrogen, and $R_{56}$ is selected from the group consisting of aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), and substituted heteroaryl groups (e.g., $C_4$-$C_{12}$ substituted heteroaryl groups).

In the structure of Formula (BI), $R_{52}$ is selected from the group consisting of hydrogen, halogens, alkyl groups, substituted alkyl groups, aryl groups, substituted aryl groups, heteroaryl groups, and substituted heteroaryl groups. If $R_{51}$ and $R_{52}$ are both aromatic groups, then (i) $R_{51}$ and $R_{52}$ are bridged by a direct bond, an alkanediyl group (e.g. a methanediyl group), an oxygen atom, a sulfur atom, or a nitrogen atom (e.g., a —N(H)— group), or (ii) at least one of $R_{51}$ and $R_{52}$ is selected from the group consisting of substituted aryl groups substituted with an electron withdrawing group, heteroaryl groups, and substituted heteroaryl groups.

In a preferred embodiment of the structure of Formula (BI), at least one of $R_{51}$ and $R_{52}$ is a group conforming to the structure of Formula (C), (CX), or (CXV)

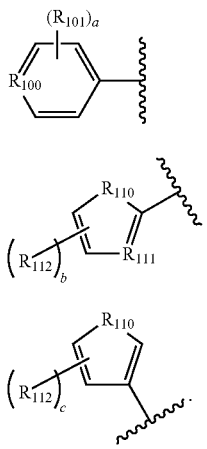

(C)

(CX)

(CXV)

In the structure of Formula (C), $R_{100}$ is selected from the group consisting of C(H), C($R_{101}$), and a nitrogen atom. The variable a is an integer from 0 to 4. Each $R_{101}$ is independently selected from the group consisting of alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), substituted heteroaryl groups (e.g., $C_4$-$C_{12}$ substituted heteroaryl groups), halogens, nitro groups, cyano groups, amine groups, hydroxy groups, alkoxy groups (e.g., $C_1$-$C_{10}$ alkoxy groups), aryloxy groups (e.g., $C_6$-$C_{12}$ aryloxy groups), alkenyl groups (e.g., $C_2$-$C_{10}$ alkenyl groups), alkynyl groups (e.g., $C_2$-$C_{10}$ alkynyl groups), alkyl ester groups (e.g., $C_1$-$C_{10}$ alkyl ester groups), and aryl ester groups (e.g., $C_6$-$C_{12}$ aryl ester groups). Further, two adjacent $R_{101}$ groups can be linked to form a fused ring structure, such as a polycyclic aryl group. In the structure of Formula (CX), $R_{110}$ is selected from the group consisting of an oxygen atom, a sulfur atom, and N($R_{115}$). $R_{115}$ is selected from the group consisting of hydrogen, alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), and substituted aryl groups (e.g., $C_6$-$C_{12}$ substituted aryl groups). $R_{111}$ is selected from the group consisting of C(H), C($R_{112}$), and a nitrogen atom. $R_{112}$ is selected from the group consisting of alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), substituted heteroaryl groups (e.g., $C_4$-$C_{12}$ substituted heteroaryl groups), halogens, nitro groups, cyano groups, amine groups, hydroxy groups, alkoxy groups (e.g., $C_1$-$C_{10}$ alkoxy groups), aryloxy groups (e.g., $C_6$-$C_{12}$ aryloxy groups), alkenyl groups (e.g., $C_1$-$C_{10}$ alkenyl groups), alkynyl groups (e.g., $C_2$-$C_{10}$ alkynyl groups), alkyl ester groups (e.g., $C_2$-$C_{10}$ alkyl ester groups), and aryl ester groups (e.g., $C_6$-$C_{12}$ aryl ester groups). Further, two adjacent $R_{112}$ groups can be linked to form a fused ring structure, such as a polycyclic aryl group. The variable b is an integer from 0 to 2. In the structure of Formula (CXV), $R_{110}$ and $R_{112}$ are selected from the same groups described above for Formula (CX), and the variable c is an integer from 0 to 3.

In the structure of Formula (BI), $R_{53}$ and $R_{54}$ are independently selected from the group consisting of hydrogen, alkyl groups, substituted alkyl groups, cycloalkyl groups, substituted cycloalkyl groups, cyano groups, nitro groups, and groups conforming to a structure of Formula (BVI), (BVII), (BVIII), or (BIX)

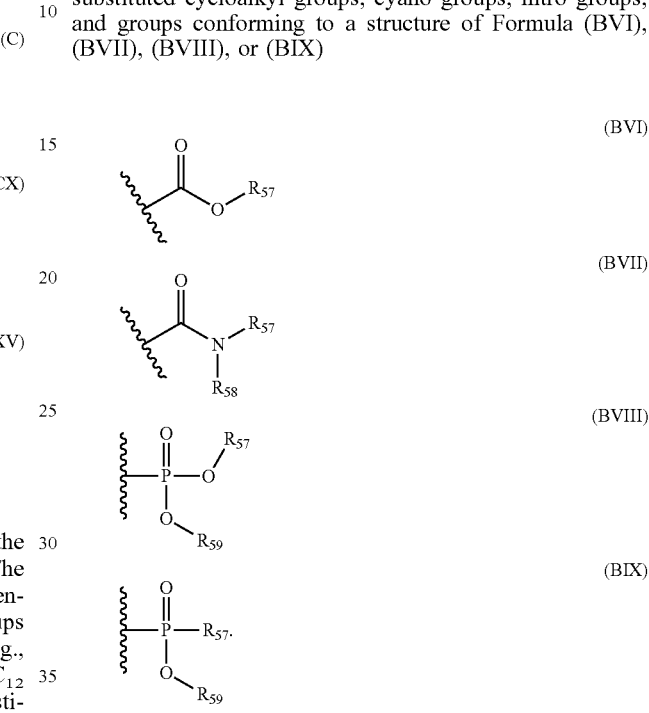

(BVI)

(BVII)

(BVIII)

(BIX)

In the structures of Formulae (BVI), (BVII), (BVIII), and (BIX), $R_{57}$ and $R_{59}$ are independently selected from the group consisting of alkyl groups (e.g., $C_1$-$C_{22}$ alkyl groups), substituted alkyl groups (e.g., $C_1$-$C_{22}$ substituted alkyl groups), cycloalkyl groups (e.g., $C_3$-$C_{22}$ cycloalkyl groups), substituted cycloalkyl groups (e.g., $C_3$-$C_{22}$ substituted cycloalkyl groups), aryl groups (e.g., $C_6$-$C_{22}$ aryl groups), substituted aryl groups (e.g., $C_6$-$C_{22}$ substituted aryl groups), heteroaryl groups (e.g., $C_4$-$C_{22}$ heteroaryl groups), and substituted heteroaryl groups (e.g., $C_4$-$C_{22}$ substituted heteroaryl groups). $R_{58}$ is selected from the group consisting of hydrogen, alkyl groups (e.g., $C_1$-$C_{22}$ alkyl groups), substituted alkyl groups (e.g., $C_1$-$C_{22}$ substituted alkyl groups), cycloalkyl groups (e.g., $C_3$-$C_{22}$ cycloalkyl groups), substituted cycloalkyl groups (e.g., $C_3$-$C_{22}$ substituted cycloalkyl groups), aryl groups (e.g., $C_6$-$C_{22}$ aryl groups), substituted aryl groups (e.g., $C_6$-$C_{22}$ substituted aryl groups), heteroaryl groups (e.g., $C_4$-$C_{22}$ heteroaryl groups), and substituted heteroaryl groups (e.g., $C_4$-$C_{22}$ substituted heteroaryl groups). For groups conforming to the structure of Formula (VIII), $R_{57}$ and $R_{59}$ can be combined to form a cyclic structure. Lastly, in the structure of Formula (I), at least one of $R_{53}$ and $R_{54}$ is selected from the group consisting of cyano groups, nitro groups, and groups conforming to a structure of Formula (VI), (VII), (VIII), or (IX). In a preferred embodiment, $R_{53}$ and $R_{54}$ are independently selected from the group consisting of hydrogen, cyano groups, nitro groups, and groups conforming to the structure of Formula (VI), where $R_{57}$ is an alkyl group (e.g., a $C_1$-$C_{22}$ alkyl group).

In another preferred embodiment, the compatibilizing agent is selected from the group consisting of compounds conforming to the structure of Formula (BX)

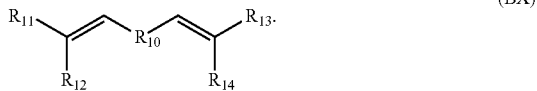
(BX)

In the structure of Formula (BX), $R_{10}$ is selected from the group consisting of arenediyl groups, substituted arenediyl groups, heteroarenediyl groups, substituted heteroarenediyl groups, and groups conforming to the structure of Formula (BXV)

(BXV)

In the structure of Formula (BXV), $R_{15}$ is selected from the group consisting of a direct bond between $R_{16}$ and $R_{17}$, an oxygen atom, an alkanediyl group, and a substituted alkanediyl group. $R_{16}$ and $R_{17}$ are independently selected from the group consisting of arenediyl groups, substituted arenediyl groups, heteroarenediyl groups, and substituted heteroarenediyl groups. In a preferred embodiment, $R_{10}$ is a group conforming to a structure selected from the group consisting of Formulae (CXX) (CXXV), (CXXX), and (CXXXV)

(CXX)

(CXXV)

(CXXX)

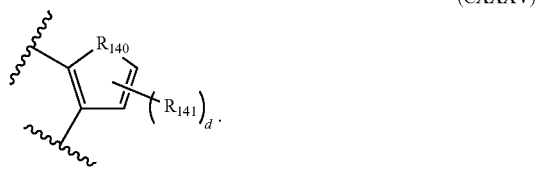
(CXXXV)

In the structures of Formulae (CXXX) and (CXXXV), $R_{140}$ is selected from the group consisting of an oxygen atom, a sulfur atom, —N(H)—, and —N($R_{145}$)—, where $R_{145}$ is selected from the group consisting of $C_1$-$C_{10}$ alkyl groups and $C_6$-$C_{12}$ aryl groups. In the structures of Formulae (CXX), (CXXV), (CXXX), and (CXXXV), each $R_{141}$ is selected from the group consisting of halogen atoms. The variable d is an integer from 0 to 2, and the variable e is an integer from 0 to 4. In another preferred embodiment, $R_{10}$ is a group conforming to the structure of Formula (BXV) in which $R_{15}$ is selected from a direct bond and an oxygen atom and $R_{16}$ and $R_{17}$ are groups conforming to the structure of Formula (CXX).

In the structure of Formula (BX), $R_{11}$, $R_{12}$, $R_{13}$, and $R_{14}$ are independently selected from the group consisting of hydrogen, alkyl groups, substituted alkyl groups, cycloalkyl groups, substituted cycloalkyl groups, cyano groups, nitro groups, and groups conforming to a structure of Formula (BVI), (BVII), (BVIII), or (BIX) as described above. In the structure of Formula (BX), at least one of $R_{11}$ and $R_{12}$ and at least one of $R_{13}$ and $R_{14}$ is selected from the group consisting of cyano groups, nitro groups, and groups conforming to a structure of Formula (BVI), (BVII), (BVIII), or (BIX).

In another preferred embodiment, the compatibilizing agent is selected from the group consisting of compounds conforming to the structure of Formula (BXX)

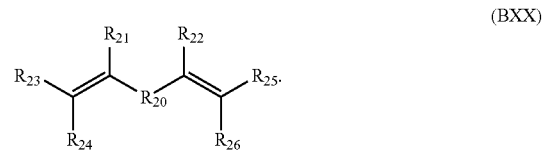
(BXX)

In the structure of Formula (BXX), $R_{20}$ is a divalent linking group. The divalent linking group can be any suitable divalent linking group. Suitable divalent linking groups include, but are not limited to, alkanediyl groups, substituted alkanediyl groups, cycloalkanediyl groups, substituted cycloalkanediyl groups, arenediyl groups, substituted arenediyl groups, heteroarenediyl groups, and substituted heteroarenediyl groups. In one preferred embodiment, $R_{20}$ is a group conforming to the structure of Formula (BXXV)

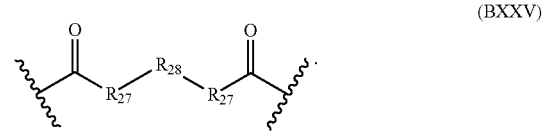
(BXXV)

In the structure of Formula (BXXV), $R_{27}$ is selected from the group consisting of an oxygen atom, —N(H)—, and —N($R_{29}$)—, where $R_{29}$ is selected from the group consisting of alkyl groups, substituted alkyl groups, cycloalkyl groups, and substituted cycloalkyl groups. $R_{28}$ is selected from the group consisting of alkanediyl groups and cycloalkanediyl groups. In a preferred embodiment, both $R_{27}$ are oxygen atoms and $R_{28}$ is an alkanediyl group (e.g., a $C_1$-$C_8$ alkanediyl group). In another preferred embodiment, $R_{20}$ is a group conforming to the structure of Formula (BXXX)

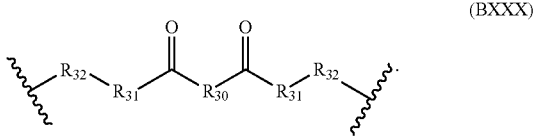
(BXXX)

In the structure of Formula (BXXX), $R_{30}$ is selected from the group consisting of alkanediyl groups and cycloalkanediyl groups. $R_{31}$ is selected from the group consisting of an oxygen atom, —N(H)—, and —N($R_{29}$)—, where $R_{29}$ is selected from the group consisting of alkyl groups, substituted alkyl groups, cycloalkyl groups, and substituted cycloalkyl groups. $R_{32}$ is selected from the group consisting of arenediyl groups, substituted arenediyl groups, heteroarenediyl groups, substituted heteroarenediyl groups, and —$R_{35}R_{36}$—, where $R_{35}$ is selected from the group consisting of arenediyl groups, substituted arenediyl groups, heteroarenediyl groups, and substituted heteroarenediyl groups, and $R_{36}$ is selected from the group consisting of alkanediyl groups (e.g., $C_1$-$C_4$ alkanediyl groups). In a preferred embodiment, $R_{30}$ is an alkanediyl group (e.g., a $C_1$-$C_8$ alkanediyl group), both $R_{31}$ are oxygen atoms, and both $R_{32}$ are selected from heteroarenediyl groups, substituted heteroarenediyl groups, and —$R_{35}R_{36}$—. More specifically, in such a preferred embodiment, $R_{32}$ preferably conforms to the structure of Formula (BXL)

(BXL)

In the structure of Formula (BXX), $R_{21}$ and $R_{22}$ are selected from the group consisting of cyano groups, nitro groups, and groups conforming to a structure of Formula (BVI), (BVII), (BVIII), or (BIX) as described above. $R_{23}$, $R_{24}$, $R_{25}$, and $R_{26}$ are independently selected from the group consisting of hydrogen, alkyl groups, substituted alkyl groups, cycloalkyl groups, substituted cycloalkyl groups, aryl groups, substituted aryl groups, heteroaryl groups, substituted heteroaryl groups, and groups conforming to the structure of Formula (BV) as described above. In the structure of Formula (BXX), at least one of $R_{23}$ and $R_{24}$ and at least one of $R_{25}$ and $R_{26}$ is selected from the group consisting of aryl groups, substituted aryl groups, heteroaryl groups, substituted heteroaryl groups, and groups conforming to the structure of Formula (BV). Further, if $R_{23}$ and $R_{24}$ are both aromatic groups, then (i) $R_{23}$ and $R_{24}$ are bridged by a direct bond or an alkyl group or (ii) at least one of $R_{23}$ and $R_{24}$ is selected from the group consisting of substituted aryl groups substituted with an electron withdrawing group, heteroaryl groups, and substituted heteroaryl groups. And, if $R_{25}$ and $R_{26}$ are both aromatic groups, then (i) $R_{25}$ and $R_{26}$ are bridged by a direct bond or an alkyl group or (ii) at least one of $R_{25}$ and $R_{26}$ is selected from the group consisting of substituted aryl groups substituted with an electron withdrawing group, heteroaryl groups, and substituted heteroaryl groups.

In another preferred embodiment, the compatibilizing agent comprises (i) at least one tertiary carbon-hydrogen bond and (ii) at least one acyclic carbon-carbon double bond. The tertiary carbon-hydrogen bond in the compatibilizing agent preferably is relatively weak or labile, which is believed to allow the hydrogen atom to dissociate from the compatibilizing agent by homolysis and yield a radical form of the compatibilizing agent bearing an unpaired electron on the tertiary carbon atom. While not wishing to be bound to any particular theory, it is believed that the tertiary nature of this carbon atom results in a radical that exhibits sufficient stability to react with polymer radicals formed in the heterophasic polymer composition. The relative strength or lability of the tertiary carbon-hydrogen bond can be characterized by the bond-dissociation energy. The bond-dissociation energy of the tertiary carbon-hydrogen bond is the enthalpy (per mole) required to break the tertiary carbon-hydrogen bond by homolysis. The tertiary carbon-hydrogen bond in the compatibilizing agent can therefore have any bond-dissociation energy that is low enough for the compatibilizing agent to be stable under storage and yet form radicals in the heterophasic polymer composition as described above. Preferably, the tertiary carbon-hydrogen bond has a bond-dissociation energy of about 380 kJ/mol or less (about 90.8 kcal/mol or less) at 298 K. More preferably, the tertiary carbon-hydrogen bond has a bond-dissociation energy of about 377 kJ/mol or less (about 90 kcal/mol or less), about 375 KJ/mol or less (about 89.6 kcal/mol or less), about 355 kJ/mol or less (about 85 kcal/mol or less), about 345 kJ/mol or less (about 82.5 kcal/mol or less), about 343 kJ/mol or less (about 82 kcal/mol or less), about 341 kJ/mol or less (about 81.5 kcal/mol or less), about 339 kJ/mol or less (about 81 kcal/mol or less), about, or about 337 kJ/mol or less (about 80.5 kcal/mol or less). While not wishing to be bound to any particular theory, the inventors believe that an acceptable bond-dissociation energy for the tertiary carbon-hydrogen bond can depend, at least in part, on the number of acyclic carbon-carbon double bonds present in the compatibilizing agent. For example, if the compatibilizing agent comprises two or more acyclic carbon-carbon double bonds, the compatibilizing agent can exhibit satisfactory performance when the bond-dissociation energy of the tertiary carbon-hydrogen bond lies higher in the ranges listed above. On the other hand, if the compatibilizing agent comprises only one acyclic carbon-carbon double bond, the bond dissociation energy of the tertiary carbon-hydrogen bond preferably lies lower in the ranges listed above. For example, if the compatibilizing agent comprises only one acyclic carbon-carbon double bond, the bond dissociation energy of the tertiary carbon-hydrogen bond preferably is about 355 kJ/mol or less (about 85 kcal/mol or less), more preferably about 345 kJ/mol or less (about 82.5 kcal/mol or less), more preferably about 343 kJ/mol or less (about 82 kcal/mol or less), and most preferably about 341 kJ/mol or less (about 81.5 kcal/mol or less). All of the bond-dissociation energies listed above are for the homolytic cleavage of the tertiary carbon-hydrogen bond at a temperature of 298 K.

The bond-dissociation energy of the tertiary carbon-hydrogen bond can be determined by any suitable means. Given the difficulties inherent in directly measuring the bond-dissociation energy of the bonds within a molecule, the bond-dissociation energy typically is calculated from a molecular model of the compatibilizing agent using commercially available molecular modeling software. For example, the bond-dissociation energy can be computed using density functional theory with the B3LYP functional. The bond-dissociation energy of the tertiary carbon-hydrogen bond ($\Delta H°$ (C—H)) in the molecule M is defined in Equation 1 below $$\Delta H°(C-H) = [H°(M\cdot) + H°(H\cdot)] - H°(M).$$ Equation 1:

In Equation 1, H°(M.), H°(M.) and H°(H.) are the absolute enthalpies at 298 K of the molecule M, M. radical and H. radical, respectively. The absolute enthalpies can be calculated, for example, with the Dmol3 program in the Materials Studio (version 8.0) software tool from Biovia. When using the Dmol3 program, the input parameters for the calculations are shown in Table A for molecule M and in Table B for radicals M. and H.. The value of H°(H.) is calculated at −0.496344 Hartrees (1 Hartree (Ha)=627.51 kcal/mol).

TABLE A

Input parameters for molecule M.

| Calculation parameters | |
|---|---|
| Opt_energy_convergence | 1.0000e−005 Ha |
| Opt_gradient_convergence | 2.0000e−003 Ha/A |
| Opt_displacement_convergence | 5.0000e−003 A |
| Opt_iterations | 500 |
| Opt_max_displacement | 0.3000 A |
| Initial_hessian | improved |
| Symmetry | off |
| Max_memory | 2048 |
| File_usage | smart |
| Scf_density_convergence | 1.000000e−006 |
| Scf_charge_mixing | 2.000000e−001 |
| Scf_diis | 6 pulay |
| Scf_iterations | 50 |
| Electronic Parameters | |
| Spin_polarization | restricted |
| Charge | 0 |
| Basis set | dnp |
| Pseudopotential | none |
| Functional | B3LYP umesh = xcoarse minu = −3 |
| Aux_density | octupole |
| Integration_grid | fine |
| Occupation | thermal 0.0050 |
| Cutoff_Global | 3.7000 angstrom |

TABLE B

Input parameters for Radical M•.

| Calculation parameters | |
|---|---|
| Opt_energy_convergence | 1.0000e−005 Ha |
| Opt_gradient_convergence | 2.0000e−003 Ha/A |
| Opt_displacement_convergence | 5.0000e−003 A |
| Opt_iterations | 500 |
| Opt_max_displacement | 0.3000 A |
| Initial_hessian | improved |
| Symmetry | off |
| Max_memory | 2048 |
| File_usage | smart |
| Scf_density_convergence | 1.000000e−006 |
| Scf_charge_mixing | 2.000000e−001 |
| Scf_diis | 6 pulay |
| Scf_iterations | 300 |
| Electronic Parameters | |
| Spin_polarization | unrestricted |
| Charge | 0 |
| Basis set | dnp |
| Pseudopotential | none |
| Functional | B3LYP umesh = xcoarse minu = −3 |
| Aux_density | octupole |
| Integration_grid | fine |
| Occupation | thermal 0.0050 |
| Cutoff_Global | 3.7000 angstrom |

The bond-dissociation energies for the tertiary carbon-hydrogen bond in the compatibilizing agent preferably are calculated using the procedure described above.

As utilized in describing the compatibilizing agent, the term "acyclic carbon-carbon double bond" refers to a carbon-carbon double bond that is not contained within a cyclic system, such as an aromatic ring. Thus, for example, the carbon-carbon double bonds in the vinylidene groups (—CH═CH—) contained within a phenyl ring are not acyclic carbon-carbon double bonds. However, the carbon-carbon double bond contained within the vinyl group of the compound styrene (i.e., phenylethene) is an acyclic carbon-carbon double bond. Further, carbon-carbon double bonds that are pendant to a cyclic system (e.g., the carbon-carbon bond is formed between a first carbon atom that is part of a cyclic system and a second carbon atom that is not part of a cyclic system) are also acyclic carbon-carbon double bonds. In a preferred embodiment, the acyclic carbon-carbon double bond in the compatibilizing agent has at least two hydrogen atoms bonded to the carbon atoms in the acyclic carbon-carbon double bond. These hydrogen atoms can be bonded to the same carbon atom in the acyclic carbon-carbon double bond, such as in a vinyl group, or these hydrogen atoms can be bonded to each of the carbon atoms in the acyclic carbon-carbon double bond, such as in a 2-phenylethenyl group. In a preferred embodiment, the acyclic carbon-carbon double bond comprises two hydrogen atoms bonded to one of the carbon atoms in the acyclic carbon-carbon double bond.

In a preferred embodiment, the compatibilizing agent conforms to the structure of Formula (DI) below

(DI)

In the structure of Formula (DI), $R_{201}$, $R_{202}$, and $R_{203}$ are independently selected from the group consisting of aryl groups, substituted aryl groups, heteroaryl groups, substituted heteroaryl groups, electron withdrawing groups, and groups conforming to the structure of Formula (DV), Formula (DVI), Formula (DVII), or Formula (DVIII) below. The structure of Formula (DV) is

(DV)

In the structure of Formula (DV), $X_{201}$ is selected from the group consisting of oxygen and —N(H)— and $R_{205}$ is selected from the group consisting of alkenyl groups, substituted alkenyl groups, substituted aryl groups, and substituted heteroaryl groups, provided the substituted aryl groups and substituted heteroaryl groups comprise at least one alkenyl group or substituted alkenyl group. The structure of Formula (DVI) is

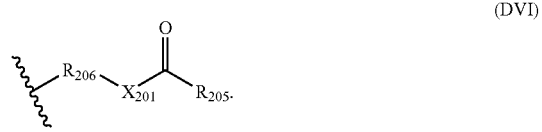

(DVI)

In the structure of Formula (DVI), $R_{206}$ is selected from the group consisting of alkanediyl groups and substituted alkanediyl groups, and $X_{201}$ and $R_{205}$ are selected from the groups set forth above for the structure of Formula (DV). The structure of Formula (DVII) is

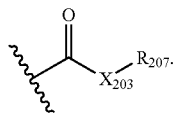

(DVII)

In the structure of Formula (DVII), $X_{203}$ is selected from the group consisting of oxygen, —N(H)—, and —N($R_7$)—. $R_{207}$ is selected from the group consisting of alkenyl groups, substituted alkenyl groups, substituted aryl groups, and substituted heteroaryl groups, provided the substituted aryl groups and substituted heteroaryl groups comprise at least one alkenyl group or substituted alkenyl group. The structure of Formula (DVIII) is

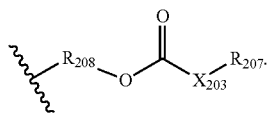

(DVIII)

In the structure of Formula (DVIII), $R_{208}$ is selected from the group consisting of alkanediyl groups, and $X_{203}$ and $R_{207}$ are selected from the groups set forth above for the structure of Formula (DVII). In the structure of Formula (DI), when two or more of $R_{201}$, $R_{202}$, and $R_{203}$ are aromatic groups, two of the groups can be fused by a linking element selected from the group consisting of a direct bond, an oxygen atom, and a sulfur atom. Further, in a preferred embodiment of the structure of Formula (DI), at least one of $R_{201}$, $R_{202}$, and $R_{203}$ is selected from the group consisting of aryl groups, substituted aryl groups, heteroaryl groups, and substituted heteroaryl groups. Lastly, at least one of $R_{201}$, $R_{202}$, and $R_{203}$ comprises at least one acyclic carbon-carbon double bond. In one particular embodiment of the structure of Formula (DI), $R_{201}$ is a cyano group, $R_{202}$ is a phenyl group, and $R_{203}$ is a 4-ethenylphenyl group.

In a more specific preferred embodiment, the compatibilizing agent conforms to the structure of Formula (DX) below

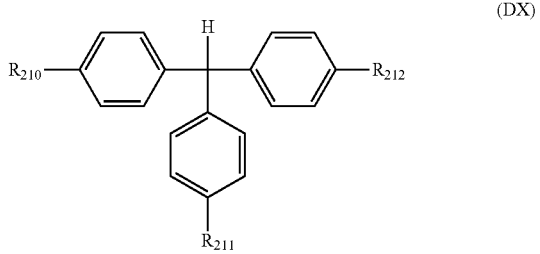

(DX)

In the structure of Formula (DX), $R_{210}$, $R_{211}$, and $R_{212}$ are independently selected from the group consisting of hydrogen, halogens, alkenyl groups, substituted alkenyl groups, groups conforming to the structure of Formula (DV) (as defined above in the description of the structure of Formula (DI)), and groups conforming to the structure —O—$R_{215}$, where $R_{215}$ is selected from the group consisting of alkenyl groups and substituted alkenyl groups. In the structure of Formula (DX), at least one of $R_{210}$, $R_{211}$, and $R_{212}$ comprises at least one acyclic carbon-carbon double bond.

In another preferred embodiment, the compatibilizing agent conforms to the structure of Formula (DXL) below

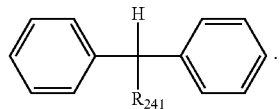

(DXL)

In the structure of Formula (DXL), $R_{241}$ is selected from the group consisting of groups conforming to the structure of Formula (DV) or Formula (DVII) (as defined above in the description of the structure of Formula (DI)). In one particular embodiment of the structure of Formula (DXL), $R_{241}$ is a group conforming to the structure of Formula (DVII), $X_{203}$ is —N(H)—, and $R_{207}$ is a substituted aryl group, preferably a 4-ethenylphenyl group. In another particular embodiment of the structure of Formula (DXL), $R_{241}$ is a group conforming to the structure of Formula (DV), $X_{201}$ is —N(H)—, and $R_{205}$ is a substituted alkenyl group, preferably a 2-phenylethenyl group.

In another preferred embodiment, the compatibilizing agent conforms to the structure of Formula (DL) below

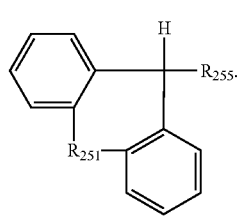

(DL)

In the structure of Formula (DL), $R_{251}$ is selected from the group consisting of a direct bond and oxygen, and $R_{255}$ is selected from the group consisting of substituted aryl groups, groups conforming to the structure of Formula (DV) (as defined above in the description of the structure of Formula (DI)), and groups conforming to the structure of Formula (DVI) (as defined above in the description of the structure of Formula (DI)). In a particular embodiment of the structure of Formula (DL), $R_{251}$ is a direct bond and $R_{255}$ is a 4-ethenylphenyl group. In another particular embodiment of the structure of Formula (DL), $R_{251}$ is an oxygen and $R_{255}$ is a 4-ethenylphenyl group. In another particular embodiment of the structure of Formula (DL), $R_{251}$ is a direct bond, $R_{255}$ is a group conforming to the structure of Formula (DV), $X_{201}$ is an oxygen, and $R_{205}$ is a 1-methylethenyl group. In another particular embodiment of the structure of Formula (DL), $R_{251}$ is a direct bond, $R_{255}$ is a group conforming to the structure of Formula (DVIII), $R_{208}$ is a methanediyl group, $X_{203}$ is —N(H)—, and $R_{207}$ is a 4-ethenylphenyl group.

In another preferred embodiment, the compatibilizing agent conforms to the structure of Formula (DXX) below

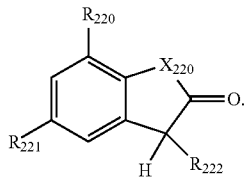

(DXX)

In the structure of Formula (DXX), $X_{220}$ is selected from the group consisting of an oxygen and —N(H)—, $R_{220}$ and $R_{221}$ are independently selected from the group consisting of hydrogen, $C_1$-$C_4$ alkyl groups, and groups conforming to the structure of Formula (DV) (as described above in connection with the structure of Formula (DI) above). $R_{222}$ is selected from the group consisting of aryl groups, substituted aryl groups, heteroaryl groups, and substituted heteroaryl groups. In the structure of Formula (DXX), at least one of $R_{220}$, $R_{221}$, and $R_{222}$ comprises at least one acyclic carbon-carbon double bond.

In another preferred embodiment, the compatibilizing agent conforms to the structure of Formula (DXXX) below

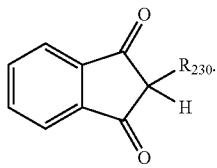

(DXXX)

In the structure of Formula (DXXX), $R_{230}$ is selected from the group consisting of substituted aryl groups and substituted heteroaryl groups, provided the substituted aryl groups and substituted heteroaryl groups comprise at least one alkenyl group or substituted alkenyl group.

In another preferred embodiment, the compatibilizing agent can be any organic compound comprising a fulvene moiety or a fulvene-derived moiety. The moiety can be unsubstituted or substituted, meaning that the hydrogens on the ring in the moiety and/or the terminal vinylic carbon atom can be replaced with non-hydrogen groups. Thus, in a preferred embodiment, the compatibilizing agent is selected from the group consisting of compounds comprising a moiety conforming to the structure of Formula (EI), compounds comprising a moiety conforming to the structure of Formula (EIII), and compounds conforming to the structure of Formula (EV)

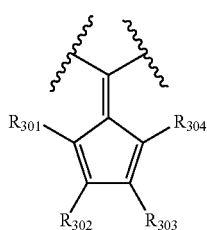

(EI)

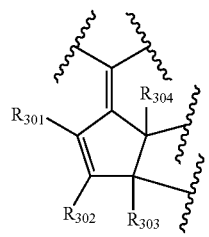

(EIII)

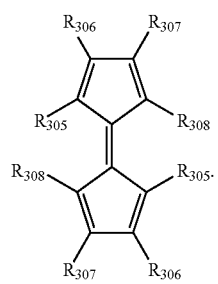

(EV)

In the structures of Formula (EI) and Formula (EIII), $R_{301}$, $R_{302}$, $R_{303}$, and $R_{304}$ are independently selected from the group consisting of hydrogen, halogens, hydrocarbyl groups, and substituted hydrocarbyl groups, provided adjacent hydrocarbyl groups or substituted hydrocarbyl groups can be combined to form a secondary ring fused to the ring of the moiety. Further, at least one of $R_{301}$, $R_{302}$, $R_{303}$, and $R_{304}$ is a hydrogen; preferably, at least two of $R_{301}$, $R_{302}$, $R_{303}$, and $R_{304}$ are hydrogens. The truncated bonds (i.e., the bonds truncated by the wavy lines) attached to the terminal vinylic carbon atom (in both Formula (EI) and Formula (EIII)) and the adjacent carbon atoms in the ring (in Formula (EIII)) represent bonds to other portions of the compatibilizing agent. In the structure of Formula (EV), $R_{305}$, $R_{306}$, $R_{307}$, and $R_{308}$ are independently selected from the group consisting of halogens In a preferred embodiment, $R_{301}$, $R_{302}$, $R_{303}$, and $R_{304}$ are independently selected from the group consisting of hydrogen, halogens, alkyl groups, substituted alkyl groups, aryl groups, substituted aryl groups, heteroaryl groups, and substituted heteroaryl groups. Suitable alkyl groups include, but are not limited to, linear and branched $C_1$-$C_{18}$ alkyl groups. Suitable substituted alkyl groups include, but are not limited to, linear and branched $C_1$-$C_{18}$ alkyl groups substituted with one or more non-hydrogen groups selected from the group consisting of halogens, hydroxy, aryl groups, substituted aryl groups, heteroaryl groups, and substituted heteroaryl groups. Suitable aryl groups include, but are not limited to, aryl groups such as phenyl and naphthyl. Suitable substituted aryl groups include, but are not limited to, monocyclic and polycyclic aryl groups substituted with one or more non-hydrogen groups selected from the group consisting of halogens, hydroxy, alkyl groups, and substituted alkyl groups. Suitable heteroaryl groups include, but are not limited to, furyl, thienyl, pyrrolyl, imidazolyl, pyrazolyl, oxazolyl, pyridinyl, pyrazinyl, pyrimidinyl and benzannulated analogs of such groups, such as benzimidazolyl. Suitable substituted heteroaryl groups include, but are not limited to, the heteroaryl groups described immediately above substituted with one or more non-hydrogen groups selected from the group consisting of halogens, hydroxy, alkyl groups, and substituted alkyl groups. In another preferred embodiment, $R_{301}$, $R_{302}$, $R_{303}$, and $R_{304}$ are each hydrogens.

In a more specific embodiment, the compatibilizing agent can be a compound conforming to the structure of Formula (EX) below

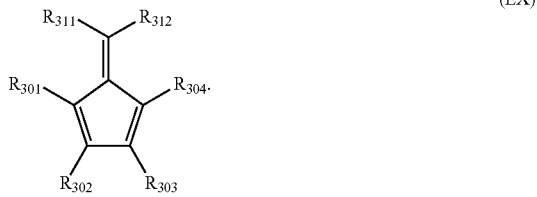

(EX)

In the structure of Formula (EX), $R_{301}$, $R_{302}$, $R_{303}$, and $R_{304}$ are independently selected from the groups recited above for the structure of Formula (EI), and $R_{311}$ and $R_{312}$ are individual substituents independently selected from the group consisting of hydrogen, alkyl groups, substituted alkyl groups, alkenyl groups, substituted alkenyl groups, amine groups, substituted amine groups, aryl groups, substituted aryl groups, heteroaryl groups, and substituted heteroaryl groups or $R_{311}$ and $R_{312}$ together form a single substituent selected from the group consisting of aryl groups, substituted aryl groups, heteroaryl groups, and substituted heteroaryl groups. Preferably, no more than one of $R_{311}$ and $R_{312}$ can be hydrogen.

In a preferred embodiment, $R_{311}$ and $R_{312}$ are independently groups conforming to a structure selected from the group consisting of Formula (F), Formula (FX), and Formula (FXV)

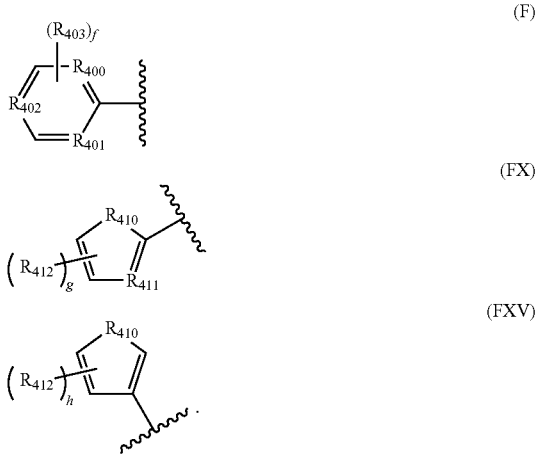

(F)

(FX)

(FXV)

In the structure of Formula (F), $R_{400}$, $R_{401}$, and $R_{402}$ are independently selected from the group consisting of C(H), C($R_{401}$), and a nitrogen atom. The variable f is an integer from 0 to 4, but does not exceed a value equal to 5−z, where z is the number of nitrogen atoms in the ring. Each $R_{401}$ is independently selected from the group consisting alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), substituted heteroaryl groups (e.g., $C_4$-$C_{12}$ substituted heteroaryl groups), halogens, nitro groups, cyano groups, amine groups, hydroxy groups, alkoxy groups (e.g., $C_1$-$C_{10}$ alkoxy groups), aryloxy groups (e.g., $C_6$-$C_{12}$ aryloxy groups), alkenyl groups (e.g., $C_2$-$C_{10}$ alkenyl groups), alkynyl groups (e.g., $C_2$-$C_{10}$ alkynyl groups), alkyl ester groups (e.g., $C_1$-$C_{10}$ alkyl ester groups), and aryl ester groups (e.g., $C_6$-$C_{12}$ aryl ester groups). Further, two adjacent $R_{401}$ groups can be linked to form a fused ring structure, such as a polycyclic aryl group. In the structure of Formula (FX), $R_{410}$ is selected from the group consisting of an oxygen atom, a sulfur atom, and N($R_{415}$). $R_{415}$ is selected from the group consisting of hydrogen, alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), and substituted aryl groups (e.g., $C_6$-$C_{12}$ substituted aryl groups). $R_{411}$ is selected from the group consisting of C(H), C($R_{112}$), and a nitrogen atom. $R_{412}$ is selected from the group consisting of alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), substituted heteroaryl groups (e.g., $C_4$-$C_{12}$ substituted heteroaryl groups), halogens, nitro groups, cyano groups, amine groups, hydroxy groups, alkoxy groups (e.g., $C_1$-$C_{10}$ alkoxy groups), aryloxy groups (e.g., $C_6$-$C_{12}$ aryloxy groups), alkenyl groups (e.g., $C_1$-$C_{10}$ alkenyl groups), alkynyl groups (e.g., $C_2$-$C_{10}$ alkynyl groups), alkyl ester groups (e.g., $C_2$-$C_{10}$ alkyl ester groups), and aryl ester groups (e.g., $C_6$-$C_{12}$ aryl ester groups). Further, two adjacent $R_{412}$ groups can be linked to form a fused ring structure, such as a polycyclic aryl group. The variable g is an integer from 0 to 2. In the structure of Formula (FXV), $R_{410}$ and $R_{412}$ are selected from the same groups described above for Formula (FX), and the variable h is an integer from 0 to 3.

In a preferred embodiment, $R_{301}$, $R_{302}$, $R_{303}$, and $R_{304}$ are each hydrogen, and $R_{311}$ and $R_{312}$ are each a phenyl group. In another preferred embodiment, $R_{301}$, $R_{302}$, $R_{303}$, and $R_{304}$ are each hydrogen, and $R_{311}$ and $R_{312}$ are each a 4-chlorophenyl group. In another preferred embodiment, $R_{301}$, $R_{302}$, $R_{303}$, and $R_{304}$ are each hydrogen, and $R_{311}$ and $R_{312}$ are each a 4-fluorophenyl group. In another preferred embodiment, $R_{301}$, $R_{302}$, $R_{303}$, and $R_{304}$ are each hydrogen, $R_{311}$ is a methyl group, and $R_{312}$ is a phenyl. In another preferred embodiment, $R_{301}$, $R_{302}$, $R_{303}$, and $R_{304}$ are each hydrogen, $R_{311}$ is hydrogen, and $R_{312}$ is a 2-thienyl group. In another preferred embodiment, $R_{301}$, $R_{302}$, $R_{303}$, and $R_{304}$ are each hydrogen, $R_{311}$ is hydrogen, and $R_{312}$ is a 3-thienyl group. In another preferred embodiment, $R_{301}$, $R_{302}$, $R_{303}$, and $R_{304}$ are each hydrogen, $R_{311}$ is a methyl group, and $R_{312}$ is a 2-furyl group. In another preferred embodiment, $R_{301}$, $R_{302}$, $R_{303}$, and $R_{304}$ are each hydrogen, $R_{311}$ is hydrogen, and $R_{312}$ is a dimethylamino group. In another preferred embodiment, $R_{301}$, $R_{302}$, $R_{303}$, and $R_{304}$ are each hydrogen, and $R_{311}$ and $R_{312}$ are each $C_1$-$C_8$ alkyl groups, preferably propyl groups. In another preferred embodiment, $R_{301}$, $R_{302}$, $R_{303}$, and $R_{304}$ are each hydrogen, $R_{311}$ is hydrogen, and $R_{312}$ is a 2-phenylethenyl group.

The compatibilizing agent can comprise multiple fulvene moieties. For example, the compatibilizing agent can comprise two fulvene moieties and conform to the structure of Formula (EXX) below:

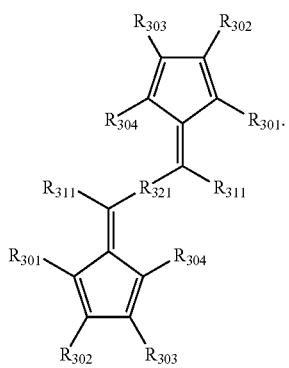

(EXX)

In the structure of Formula (EXX), each $R_{301}$, $R_{302}$, $R_{303}$, and $R_{304}$ is independently selected from the groups recited above in the structure of Formula (EI), each $R_{311}$ is independently selected from the group recited above in the structure of Formula (EX), and $R_{321}$ is selected from the group consisting of alkanediyl groups, substituted alkanediyl groups, arenediyl groups, substituted arenediyl groups, heteroarenediyl groups, and substituted heteroarenediyl groups. In a preferred embodiment, each $R_{301}$, $R_{302}$, $R_{303}$, and $R_{304}$ is hydrogen, each $R_{311}$ is an aromatic group, and $R_{321}$ is an arenediyl group. More specifically, in such a preferred embodiment, each $R_{301}$, $R_{302}$, $R_{303}$, and $R_{304}$ is hydrogen, each $R_{311}$ is a phenyl group, and $R_{321}$ is a phen-1,4-diyl group. In another preferred embodiment, each $R_{301}$, $R_{302}$, $R_{303}$, $R_{304}$, and $R_{311}$ is hydrogen, and $R_{321}$ is an arenediyl group, preferably a phen-1,4-diyl group.

In certain instances, the compatibilizing agent can undergo a dimerization or oligomerization via an auto-Diels-Alder reaction. In such an auto-Diels-Alder reaction, the cyclopentadienyl moiety in one molecule of the compatibilizing agent acts as the diene, and a double bond in the cyclopentadienyl moiety of another molecule of the compatibilizing agent acts as the dienophile. When a fulvene moiety conforming to the structure of Formula (EI) is the dienophile in a Diels-Alder reaction, the fulvene moiety is transformed into a moiety conforming to the structure of Formula (EIII) above. In the structure of Formula (EIII) above, the truncated bonds attached to the adjacent carbon atoms in the ring represent bonds forming part of a cyclic moiety resulting from the reaction with the diene. Thus, in a more specific example of a compatibilizing agent comprising a moiety conforming to the structure of Formula (EIII) above, the compatibilizing agent can comprise a moiety conforming to the structure of Formula (EIIIA) below

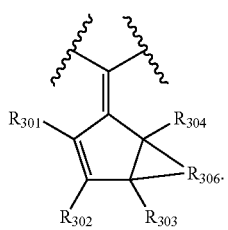

(EIIIA)

In the structure of Formula (EIIIA), $R_{301}$, $R_{302}$, $R_{303}$, and $R_{304}$ are selected from the groups recited above, and $R_{306}$ is a vicinal divalent moiety comprising at least one double bond, such as a divalent cyclic moiety (e.g., a divalent cyclopentenyl moiety). When $R_{306}$ is a divalent cyclic moiety (e.g., a divalent cyclopentenyl moiety), the compatibilizing agent comprises a bicyclic moiety formed by the bonds to adjacent carbon atoms in the cyclic moiety.

The dimer resulting from the auto-Diels-Alder reaction of a compatibilizing agent conforming to the structure of Formula (EX) above will conform to the structure of Formula (EXA) below

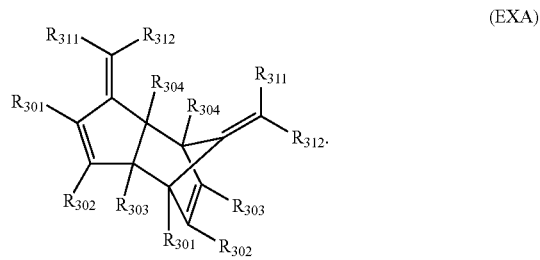

(EXA)

In the structure of Formula (EXA), $R_{301}$, $R_{302}$, $R_{303}$, $R_{304}$, $R_{311}$, and $R_{312}$ are selected from the groups disclosed above for the compound conforming to the structure of Formula (EX). The dimer can be either the endo or exo isomer. Further, a dimer possessing the structure of Formula (EXA) can serve as the dienophile in subsequent Diels-Alder reactions with a diene, with such subsequent reactions yielding a variety of oligomeric species. While not wishing to be bound to any particular theory, it is believed that the dimeric and oligomeric species described above can undergo a retro-Diels-Alder reaction to yield the fulvene-containing compounds from which the dimeric and oligomeric species were originally derived. It is believed that this retro-Diels-Alder reaction can occur when a polymer composition containing the dimeric or oligomeric species is heated during processing, such as the heating that occurs when the polymer composition is extruded.

The compatibilizing agent can have any suitable molar mass. As will be understood by those of ordinary skill in the art, the molar mass of a compound, in combination with other factors, influences the melting point and boiling point of a compound. Thus, compounds with higher molar masses generally have higher melting points and boiling points. While not wishing to be bound to any particular theory, it is believed that the melting point and boiling point of the compatibilizing agent may influence the efficacy of the compatibilizing agent in the compositions of the invention. For example, it is believed that a compatibilizing agent having a relatively low molar mass and low boiling point (e.g., a boiling point that is significantly lower than the temperature at which the polymer composition is extruded) may volatilize to a significant degree during the extrusion process, thereby leaving less compatibilizing agent to modify the properties of the polymer composition. Thus, the compatibilizing agent preferably has a molar mass that is high enough that the compatibilizing agent exhibits a boiling point that is greater than the temperature at which the polymer composition is extruded. In a series of preferred embodiments, the compatibilizing agent preferably has a molar mass of about 130 g/mol or more, about 140 g/mol or more, about 150 g/mol or more, or about 160 g/mol or more. Also, it is believed that a compatibilizing agent having a relatively high melting point (e.g., a melting point that is higher than the temperature at which the polymer composition is extruded) may not disperse well in the molten polymer during the extrusion process, or at least not disperse as well as a compatibilizing agent having a melting point below the extrusion temperature. And poor dispersion of the compatibilizing agent will negatively impact the physical property improvements that can be achieved as compared to a well-dispersed compatibilizing agent. Thus, in a series of preferred embodiments, the compatibilizing has a melting point of about 230° C. or less, about 220° C. or less, about 210° C. or less, or about 200° C. or less.

The concentration of the compatibilizing agent in the composition can be varied to meet the objectives of the end user. For example, the concentration can be varied in order to achieve a desired increase in the MFR of the polymer composition with a minimal decrease (or potentially even an increase) in the strength of the polymer, in particular the impact strength. In a preferred embodiment, the compatibilizing agent can be present in an amount of about 10 ppm or more, about 50 ppm or more, about 100 ppm or more, about 150 ppm or more, or about 200 ppm or more, based on the total weight of the polymer composition. In another preferred embodiment, the compatibilizing agent can be present in an amount of about 5 wt. % (50,000 ppm) or less, about 4 wt. % (40,000 ppm) or less, about 3 wt. % (30,000 ppm) or less, about 2 wt. % (20,000 ppm) or less, about 1 wt. % (10,000 ppm) or less, or about 0.5 wt. % (5,000 ppm) or less, based on the total weight of the polymer composition. Thus, in certain preferred embodiments, the compatibilizing agent can be present in an amount of about 10 to about 50,000 ppm, about 100 to about 10,000 ppm, or about 200 to about 5,000 ppm, based on the total weight of the polymer composition.

When a chemical free radical generator is employed (as discussed below), the concentration of the compatibilizing agent in the polymer composition can additionally or alternatively be expressed in terms of a ratio between the amount of the compatibilizing agent and the amount of the chemical free radical generator. In order to normalize this ratio for differences in the molecular weight of compatibilizing agents and number of peroxide bonds in the chemical free radical generators, the ratio is usual expressed as a ratio of the number of moles of compatibilizing agent present in the composition to the molar equivalents of peroxide bonds (O—O bonds) present from the addition of the chemical free radical generator. Preferably, the ratio (i.e., ratio of moles of compatibilizing agent to molar equivalents of peroxide bonds) is about 1:10 or more, about 1:5 or more, about 3:10 or more, about 2:5 or more, about 1:2 or more, about 3:5 or more, about 7:10 or more, about 4:5 or more, about 9:10 or more, or about 1:1 or more. In another preferred embodiment, the ratio is about 10:1 or less, about 5:1 or less, about 10:3 or less, about 5:2 or less, about 2:1 or less, about 5:3 or less, about 10:7 or less, about 5:4 or less, about 10:9 or less, or about 1:1 or less. Thus, in a series of preferred embodiments, the compatibilizing agent can be present in the composition in a ratio of moles of compatibilizing agent to molar equivalents of peroxide bonds of about 1:10 to about 10:1, about 1:5 to about 5:1, about 1:4 to about 4:1, about 3:10 to about 10:3, about 2:5 to about 5:2, or about 1:2 to about 2:1.

The second step of the method of the invention entails providing a heterophasic polymer composition. The heterophasic polymer composition preferably is a heterophasic polyolefin polymer composition. The subject heterophasic polyolefin polymers that can be advantageously modified according to the method of the invention are characterized by at least two distinct phases: a propylene polymer phase; and an ethylene polymer phase. The propylene polymer phase preferably comprises propylene polymers selected from the group consisting of polypropylene homopolymers and copolymers of propylene and up to 50 wt. % of ethylene and/or $C_4$-$C_{10}$ α-olefins. The ethylene polymer phase preferably comprises ethylene polymers selected from the group consisting of ethylene homopolymers and copolymers of ethylene and $C_3$-$C_{10}$ α-olefins. The ethylene content of the ethylene polymer phase preferably is at least 8 wt. %. When the ethylene phase is a copolymer of ethylene and $C_3$-$C_{10}$ α-olefins, the ethylene content of the ethylene phase can range from 8 to 90 wt. %. In one embodiment, the ethylene content of the ethylene phase preferably is at least 50 wt. %. Either the propylene polymer phase or the ethylene polymer phase can form the continuous phase of the composition and the other will form the discrete or dispersed phase of the composition. For example, the ethylene polymer phase can be the discontinuous phase and the polypropylene polymer phase can be the continuous phase. In one embodiment of the invention, the propylene content of the propylene polymer phase preferably is greater than the propylene content of the ethylene polymer phase.

The relative concentrations of the propylene polymer phase and the ethylene polymer phase in the heterophasic polymer composition can vary over a wide range. By way of example, the ethylene polymer phase can comprise from 5 to 80 wt. % of the total weight of propylene polymers and ethylene polymers in the composition, and the propylene polymer phase can comprise from 20 to 95 wt. % of the total weight of propylene polymers and ethylene polymers in the composition.

In various embodiments of the invention, (i) the ethylene content can range from 5 to 75 wt. %, or even 5 to 60 wt. %, based on the total propylene polymer and ethylene polymer content in the heterophasic composition, (ii) the ethylene polymer phase can be an ethylene-propylene or ethylene-octene elastomer, and/or (iii) the propylene content of the propylene polymer phase can be 80 wt. % or greater.

The method of the invention is particularly useful for modifying polypropylene impact copolymers. Suitable impact copolymers can be characterized by (i) a continuous phase comprising polypropylene polymers selected from the group consisting of polypropylene homopolymers and copolymers of propylene and up to 50 wt. % of ethylene and/or $C_4$-$C_{10}$ α-olefins and (ii) a discontinuous phase comprising elastomeric ethylene polymers selected from the group consisting of copolymers of ethylene and $C_3$-$C_{10}$ α-olefin monomers. Preferably, the ethylene polymers have an ethylene content of from 8 to 90 wt. %.

In various embodiments of the invention directed to propylene impact copolymers, (i) the ethylene content of the discontinuous phase can be from 8 to 80 wt. %, (ii) the ethylene content of the heterophasic composition can be from 5 to 30 wt. %, based on the total propylene polymers and ethylene polymers in the composition; (iii) the propylene content of the continuous phase can be 80 wt. % or greater and/or (iv) the discontinuous phase can be from 5 to 35 wt. % of the total propylene polymers and ethylene polymers in the composition.

Examples of heterophasic polyolefin polymers that can be modified are impact copolymers characterized by a relatively rigid, polypropylene homopolymer matrix (continuous phase) and a finely dispersed phase of ethylene-propylene rubber (EPR) particles. Such polypropylene impact copolymers can be made in a two-stage process, where the polypropylene homopolymer is polymerized first and the ethylene-propylene rubber is polymerized in a second stage. Alternatively, the impact copolymer can be made in three or more stages, as is known in the art. Suitable processes can be found in the following references: U.S. Pat. No. 5,639,822 and U.S. Pat. No. 7,649,052 B2. Examples of suitable processes to make polypropylene impact copolymers are known in the industry by the commercial names Spheripol®, Unipol®, Mitsui process, Novolen process, Spherizone®, Catalloy®, Chisso process, Innovene®, Borstar®, and Sinopec process. These processes could use heterogeneous or homogeneous Ziegler-Natta or metallocene catalysts to accomplish the polymerization.

The heterophasic polymer composition can be formed by melt mixing two or more polymer compositions, which form at least two distinct phases in the solid state. By way of example, the heterophasic composition can comprise three distinct phases. The heterophasic polymer composition can result from melt mixing two or more types of recycled polymer compositions (e.g., polyolefin polymer compositions). Accordingly, the phrase "providing a heterophasic polymer composition" as used herein includes employing a polymer composition in the process that is already heterophasic, as well as melt mixing two or more polymer compositions during the process, wherein the two or more polymer compositions form a heterophasic system. For example, the heterophasic polymer composition can be made by melt mixing a polypropylene homopolymer and an ethylene/α-olefin copolymer, such as an ethylene/butene elastomer. Examples of suitable ethylene/α-olefin copolymers are commercially available under the names Engage™ Exact®, Vistamaxx®, Versify™, INFUSE™, Nordel™, Vistalon®, Exxelor™, and Affinity™. Furthermore, it can be understood that the miscibility of the polymer components that form the heterophasic polymer composition can vary when the composition is heated above the melting point of the continuous phase in the system, yet the system will form two or more phases when it cools and solidifies. Examples of heterophasic polymer compositions can be found in U.S. Pat. No. 8,207,272 B2 and European Patent No. EP 1 391 482 B1.

Certain characteristics of the bulk heterophasic polymer composition (as measured prior to treatment with the compatibilizing agent) have been found to influence the physical property improvements (e.g., increase in impact strength) realized through the incorporation of the compatibilizing agent. In particular, with respect to the bulk characteristics of the heterophasic polymer composition, the ethylene preferably comprises about 6 wt. % or more, about 7 wt. % or more, about 8 wt. % or more, or about 9 wt. % or more of the total weight of the heterophasic polymer composition. The heterophasic polymer composition preferably contains about 10 wt. % or more, about 12 wt. % or more, about 15 wt. % or more, or about 16 wt. % or more xylene solubles or amorphous content. Further, about 5 mol. % or more, about 7 mol. % or more, about 8 mol. % or more, or about 9 mol. % or more of the ethylene present in the heterophasic polymer composition preferably is present in ethylene triads (i.e., a group of three ethylene monomer units bonded in sequence). Lastly, the number-average sequence length of ethylene runs (ethylene monomer units bonded in sequence) in the heterophasic polymer composition preferably is about 3 or more, about 3.25 or more, about 3.5 or more, about 3.75 or more, or about 4 or more. The mol. % of ethylene in ethylene triads and the number-average sequence length of ethylene runs can both be measured using $^{13}C$ nuclear magnetic resonance (NMR) techniques known in the art. The heterophasic polymer composition can exhibit any one of the characteristics described in this paragraph. Preferably, the heterophasic polymer composition exhibits two or more of the characteristics described in this paragraph. Most preferably, the heterophasic polymer composition exhibits all of the characteristics described in this paragraph.

Certain characteristics of the ethylene phase of the heterophasic polymer composition (as measured prior to treatment with the compatibilizing agent) have also been found to influence the physical property improvements (e.g., increase in impact strength) realized through the incorporation of the compatibilizing agent. The characteristics of the ethylene phase of the composition can be measured using any suitable technique, such as temperature rising elution fractionation (TREF) and $^{13}C$ NMR analysis of the fractions obtained. In a preferred embodiment, about 30 mol. % or more, about 40 mol. % or more, or about 50 mol. % or more of the ethylene present in a 60° C. TREF fraction of the heterophasic polymer composition is present in ethylene triads. In another preferred embodiment, about 30 mol. % or more, about 40 mol. % or more, or about 50 mol. % or more of the ethylene present in an 80° C. TREF fraction of the heterophasic polymer composition is present in ethylene triads. In another preferred embodiment, about 5 mol. % or more, about 10 mol. % or more, about 15 mol. % or more, or about 20 mol. % or more of the ethylene present in a 100° C. TREF fraction of the heterophasic polymer composition is present in ethylene triads. The number-average sequence length of ethylene runs present in a 60° C. TREF fraction of the heterophasic polymer composition preferably is about 3 or more, about 4 or more, about 5 or more, or about 6 or more. The number-average sequence length of ethylene runs present in an 80° C. TREF fraction of the heterophasic polymer composition preferably is about 7 or more, about 8 or more, about 9 or more, or about 10 or more. The number-average sequence length of ethylene runs present in a 100° C. TREF fraction of the heterophasic polymer composition preferably is about 10 or more, about 12 or more, about 15 or more, or about 16 or more. The heterophasic polymer composition can exhibit any one of the TREF fraction characteristics described above or any suitable combination of the TREF fraction characteristics described above. In a preferred embodiment, the heterophasic polymer composition exhibits all of the TREF fraction characteristics described above (i.e., the ethylene triad and number-average sequence length characteristics for the 60° C., 80° C., and 100° C. TREF fractions described above).

Heterophasic polymer compositions exhibiting the characteristics described in the two preceding paragraphs have been observed to respond more favorably to the addition of the compatibilizing agent than heterophasic polymer compositions that do not exhibit these characteristics. In particular, heterophasic polymer compositions exhibiting these characteristics show significant improvements in impact strength when processed according to the method of the invention, whereas heterophasic polymer compositions that do not exhibit these characteristics do not show such marked improvements when processed under the same conditions. This differential response and performance has been observed even when the different polymer compositions have approximately the same total ethylene content (i.e., the percent ethylene in each polymer composition is approximately the same). This result is surprising and was not anticipated.

In one embodiment of the invention, the heterophasic polymer composition does not have any polyolefin constituents with unsaturated bonds. In particular, both the propylene polymers in the propylene phase and the ethylene polymers in the ethylene phase are free of unsaturated bonds.

In another embodiment of the invention, in addition to the propylene polymer and ethylene polymer components, the heterophasic polymer composition can further comprise an elastomer, such as elastomeric ethylene copolymers, elastomeric propylene copolymers, styrene block copolymers, such as styrene-butadiene-styrene (SBS), styrene-ethylene-butylene-styrene (SEBS), styrene-ethylene-propylene-styrene (SEPS) and styrene-isoprene-styrene (SIS), plastomers, ethylene-propylene-diene terpolymers, LLDPE, LDPE, VLDPE, polybutadiene, polyisoprene, natural rubber, and amorphous polyolefins. The rubbers can be virgin or recycled.

As noted above, the method entails the step of mixing the compatibilizing agent and the heterophasic polymer composition. The compatibilizing agent and the heterophasic polymer composition can be mixed using any suitable technique or apparatus. In one embodiment of the invention, the heterophasic polymer composition is modified by melt mixing the polymer composition with a compatibilizing agent in the presence of free radicals, which have been generated in the composition. The melt mixing step is conducted under conditions such that the composition is heated to above the melting temperature of the major polyolefin component of the composition and mixed while in the molten state. Examples of suitable melt mixing processes include melt compounding, such as in an extruder, injection molding, and mixing in a Banbury mixer or kneader. By way of example, the mixture can be melt mixed at a temperature of from 160° C. to 300° C. In particular, propylene impact copolymers can be melt mixed at a temperature of from 180° C. to 290° C. The heterophasic polymer composition (propylene polymer phase and ethylene polymer phase), compatibilizing agent and an organic peroxide can be melt compounded in an extruder at a temperature above the melting temperature of all of the polyolefin polymers in the composition.

In another embodiment of the invention, the heterophasic polymer composition can be dissolved in a solvent, the compatibilizing agent can be added to the resulting polymer solution, and the free radicals can be generated in the solution. In another embodiment of the invention, the compatibilizing agent can be combined with the heterophasic polymer composition in the solid state and free radicals can be generated during solid-state shear pulverization as described in *Macromolecules*, "Ester Functionalization of Polypropylene via Controlled Decomposition of Benzoyl Peroxide during Solid-State Shear Pulverization"—vol. 46, pp. 7834-7844 (2013).

Conventional processing equipment may be used to mix the heterophasic polymer composition (e.g., propylene polymers and ethylene polymers) and compatibilizing agent together in a single step, in the presence of free radicals that are either added to the mixture, such as an organic peroxide, or generated in-situ, such as by shear, UV light, etc. Nevertheless, it is also possible to mix various combinations of the components in multiple steps and in various sequences, and subsequently subject the mixture to conditions whereby the compatibilizing agent reacts with the polyolefin polymers, as described herein.

For example, the compatibilizing agent and/or the free radical generator (when a chemical compound is used) can be added to the polymer in the form of one or masterbatch compositions. Suitable masterbatch compositions can comprise the compatibilizing agent and/or the free radical generator in a carrier resin. The compatibilizing agent and/or the free radical generator can be present in the masterbatch composition in an amount of about 1 wt. % to about 80 wt. % based on the total weight of the composition. Any suitable carrier resin can be used in the masterbatch compositions, such as any suitable thermoplastic polymer. For example, the carrier resin for the masterbatch compositions can be a polyolefin polymer, such as a polypropylene impact copolymer, a polyolefin copolymer, an ethylene/α-olefin copolymer, a polyethylene homopolymer, a linear low density polyethylene polymer, a polyolefin wax, or mixtures of such polymers. The carrier resin can also be a propylene polymer or an ethylene polymer that is the same as or similar to the propylene polymer or ethylene polymer present in the heterophasic polyolefin polymer composition. Such a masterbatch composition would allow the end user to manipulate the ratio of propylene polymer(s) to ethylene polymer(s) present in the heterophasic polymer composition. This may be preferred when the end user needs to modify the propylene to ethylene ratio of a commercial resin grade in order to achieve the desired set of properties (e.g., balance of impact and stiffness).

The method further comprises the step of generating free radicals in the resulting mixture of the compatibilizing agent and the heterophasic polymer composition. More specifically, this step involves generating free radicals in the propylene polymer phase and the ethylene polymer phase of the heterophasic polymer composition. The free radicals can be generated in the heterophasic polymer composition by any suitable means.

A free radical generator is employed in the present invention to cause polymer chain scission and thereby positively affect (i.e., increase) the MFR of the heterophasic polymer composition, while generating sufficient free radicals to foster the reaction of the compatibilizing agent with the propylene and ethylene polymers in the heterophasic polymer composition. The free radical generator can be a chemical compound, such as an organic peroxide or a bis-azo compound, or free radicals may be generated by subjecting the mixture of compatibilizing agent and heterophasic polymer composition to ultrasound, shear, an electron beam (for example β-rays), light (for example UV light), heat and radiation (for example γ-rays and X-rays), or combinations of the foregoing.

Organic peroxides having one or more O—O functionalities are of particular utility as the free radical generator in the method of the present invention. Examples of such organic peroxides include: 2,5-dimethyl-2,5-di(t-butylperoxy)hexane, 2,5-dimethyl-2,5-di(t-butyl peroxy)hexyne-3,3, 6,6,9,9-pentamethyl-3-(ethyl acetate)-1,2,4,5-tetraoxy cyclononane, t-butyl hydroperoxide, hydrogen peroxide, dicumyl peroxide, t-butyl peroxy isopropyl carbonate, di-t-butyl peroxide, p-chlorobenzoyl peroxide, dibenzoyl diperoxide, t-butyl cumyl peroxide; t-butyl hydroxyethyl peroxide, di-t-amyl peroxide and 2,5-dimethylhexene-2,5-diperisononanoate, acetylcyclohexanesulphonyl peroxide, diisopropyl peroxydicarbonate, tert-amyl perneodecanoate, tert-butyl-perneodecanoate, tert-butylperpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinoyl peroxide, diacetyl peroxide, dibenzoyl peroxide, tert-butyl per-2-ethylhexanoate, bis(4-chlorobenzoyl) peroxide, tert-butyl perisobutyrate, tert-butyl permaleate, 1,1-bis(tert-butylperoxy)-3,5,5-trimethylcyclohexane, 1,1-bis(tert-butylperoxy)cyclohexane, tert-butyl peroxyisopropyl carbonate, tert-butyl perisononaoate, 2,5-dimethylhexane 2,5-dibenzoate, tert-butyl peracetate, tert-amyl perbenzoate, tert-butyl perbenzoate, 2,2-bis(tert-butylperoxy)butane, 2,2-bis(tert-butylperoxy)propane, dicumyl peroxide, 2,5-dimethylhexane 2,5-di-tert-butylperoxid, 3-tert-butylperoxy-3-phenyl phthalide, di-tert-amyl peroxide, α,α'-bis(tert-butylperoxyisopropyl)benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

The organic peroxide can be present in the polymer composition in any suitable amount. The suitable amount of organic peroxide will depend upon several factors, such as the particular polymer that is used in the composition, the starting MFR of the heterophasic polymer composition, and the desired change in the MFR of the heterophasic polymer composition. In a preferred embodiment, the organic peroxide can be present in the polymer composition in an amount of about 10 ppm or more, about 50 ppm or more, or about 100 ppm or more, based on the total weight of the polymer composition. In another preferred embodiment, the organic peroxide can be present in the polymer composition in an amount of about 2 wt. % (20,000 ppm) or less, about 1 wt. % (10,000 ppm) or less, about 0.5 wt. % (5,000 ppm) or less, about 0.4 wt. % (4,000 ppm) or less, about 0.3 wt. % (3,000 ppm) or less, about 0.2 wt. % (2,000 ppm) or less, or about 0.1 wt. % (1,000 ppm) or less, based on the total weight of the polymer composition. Thus, in a series of preferred embodiments, the organic peroxide can be present in the polymer composition in an amount of about 10 to about 20,000 ppm, about 50 to about 5,000 ppm, about 100 to about 2,000 ppm, or about 100 to about 1,000 ppm, based on the total weight of the polymer composition. The amount of organic peroxide can also be expressed in terms of a molar ratio of the compatibilizing agent and peroxide bonds, as is described above.

Suitable bis azo compounds may also be employed as a source of free radicals. Such azo compounds include, for example, 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl 2,2'-azobisisobutyrate, 2-(carbamoylazo)isobutyronitrile, 2,2'-azobis(2,4,4-trimethylpentane), 2,2'-azobis(2-methyl-propane), 2,2'-azobis(N,N'-dimethyleneisobutyramidine) as free base or hydrochloride, 2,2'-azobis(2-amidinopropane) as free base or hydrochloride, 2,2'-azobis{2-methyl-N-[1,1-bis(hydroxymethyl)ethyl]propionamide}, and 2,2'-azobis{2-methyl-N-[1,1-bis(hydroxymethyl)-2-hydroxyethyl]propionamide}.

Other chemical compounds useful as free radical generators include 2,3-dimethyl-2,3-diphenylbutane and sterically hindered hydroxylamine ester. The various free radical generators described above may be employed alone or in combination.

As is generally described above, at least a portion of the free radicals generated in the propylene polymer phase and the ethylene polymer phase react with the reactive functional groups present on the compatibilizing agent. Specifically, the free radicals and the reactive functional groups react in a radical addition reaction thereby bonding the compatibilizing agent to the polymer. When the compatibilizing agent reacts with a free radical in the propylene polymer phase and a free radical in the ethylene polymer phase, the compatibilizing agent then provides a link or bridge between the two phases. While not wishing to be bound to any particular theory, it is believed that this link or bridge between the propylene polymer phase and the ethylene polymer phase is responsible for the increase in strength observed in heterophasic polymer compositions that have been modified according to the method of the invention.

The heterophasic polymer composition of the present invention is compatible with various types of additives conventionally used in thermoplastic compositions, including stabilizers, UV absorbers, hindered-amine light stabilizers (HALS), antioxidants, flame retardants, acid neutralizers, slip agents, antiblocking agents, antistatic agents, antiscratch agents, processing aids, blowing agents, colorants, opacifiers, clarifiers, and/or nucleating agents. By way of further example, the composition can comprise fillers, such as calcium carbonate, talc, glass fibers, glass spheres, inorganic whiskers such as Hyperform® HPR-803i available from Milliken Chemical, USA, magnesium oxysulfate whiskers, calcium sulfate whiskers, calcium carbonate whiskers, mica, wollastonite, clays, such as montmorillonite, and bio-sourced or natural filler. The additives can comprise up to 75 wt. % of the total components in the modified heterophasic polymer composition.

The heterophasic polymer composition of the present invention can be used in conventional polymer processing applications, including but not limited to injection molding, thin-wall injection molding, single-screw compounding, twin-screw compounding, Banbury mixing, co-kneader mixing, two-roll milling, sheet extrusion, fiber extrusion, film extrusion, pipe extrusion, profile extrusion, extrusion coating, extrusion blow molding, injection blow molding, injection stretch blow molding, compression molding, extrusion compression molding, compression blow forming, compression stretch blow forming, thermoforming, and rotomolding. Articles made using the heterophasic polymer composition of the invention can be comprised of multiple layers, with one or any suitable number of the multiple layers containing a heterophasic polymer composition of the invention. By way of example, typical end-use products include containers, packaging, automotive parts, bottles, expanded or foamed articles, appliance parts, closures, cups, furniture, housewares, battery cases, crates, pallets, films, sheet, fibers, pipe, and rotationally molded parts.

The following examples further illustrate the subject matter described above but, of course, should not be construed as in any way limiting the scope thereof. The following methods, unless noted, were used to determine the properties described in the following examples.

Each of the compositions was compounded by blending the components in a closed container for approximately one minute. The compositions were then melt compounded on a twin-screw extruder using typical processing conditions for polypropylene injection molding grades. The extrudate (in the form of a strand) for each polypropylene copolymer composition was cooled in a water bath and subsequently pelletized.

The pelletized compositions were then used to form bars by injection molding the compositions under typical conditions for polypropylene injection molding grades to make ISO size sample testing bars. The resulting bars measured approximately 80 mm long, approximately 10 mm wide, and approximately 4.0 mm thick.

The melt flow rate (MFR) was determined on the pelletized compositions according to (ASTM D1238) at 230° C. with a load of 2.16 kg for polypropylene.

The notched Izod impact strength for the bars was measured according to ISO method 180/A. The notched Izod impact strength was measured at +23° C. on bars that had been conditioned at either +23° C. or −30° C.

Temperature rising elution fractionation (TREF) was carried out as follows: Approximately 3.0 g of polymer and 2.0 wt. % Irganox 1010 (Ciba Specialty Chemicals, Switzerland) were dissolved in 300 mL of xylene at 130° C. in a glass reactor. The reactor was then transferred to a temperature-controlled oil bath and filled with sand (white quartz, Sigma-Aldrich, South Africa), used as a crystallization support. The oil bath and support were both preheated to 130° C. The oil bath was then cooled at a controlled rate of 1° C./h in order to facilitate the controlled crystallization of the polymer. The crystallized mixture was then packed into a stainless steel column which was inserted into a modified gas chromatography oven for the elution step. Xylene (preheated) was used as eluent in order to collect the fractions at predetermined intervals as the temperature of the oven was raised. The fractions were isolated by precipitation in acetone, followed by drying to a constant weight. Fractions were collected from the starting temperature to the final temperature of the fraction, which is to say the 30° C. fraction was collected from room temperature to 30° C., the 60° C. fraction is the material that was collected from 30° C. to 60° C., the 80° C. fraction is the material collected from 60° C. to 80° C., and the 100° C. fraction is the material that was collected from 80° C. to 100° C. as the temperature was gradually increased during collection.

$^{13}$C NMR spectroscopy was performed using the following experimental conditions for all NMR measurements: a 600 MHz Varian Unity instrument, resonance frequency of 150 MHz for carbon-13, analyses carried out at 120° C. in nitrogen atmosphere, acquisition of 0.79 seconds, delay time of 15 seconds, 2500 scans per sample, about 60 mg of the sample dissolved in deuterated 1,1,2,2-tetrachloroethane. The relative mol. % ethylene and propylene and sequence analysis (including the relative mol. % of ethylene triads or % EEE) were accomplished using standard integration techniques. The ethylene number-average sequence length ($n_E$) was calculated using the % EE and % EP from the NMR sequencing according to the following equation:

$$n_E = (\% \text{ EE} + \tfrac{1}{2}\% \text{ EP}) / (\tfrac{1}{2}\% \text{ EP})$$

where % EE is the relative molar ratio of ethylene monomer units bonded to another ethylene monomer unit and % EP is the relative molar ration of ethylene monomer units bonded to a propylene monomer unit as determined by NMR integrations of a particular sample or sample fraction.

Example 1

The following example demonstrates the effect of the number-average sequence length of ethylene in the unmodified heterophasic polyolefin composition in the context of the method of the present invention.

Four heterophasic polymer compositions were produced. Polypropylene impact copolymers, Samples 1A-1D, were modified by mixing the heterophasic polymers with a peroxide, 2,5-Bis(tert-butylperoxy)-2,5-dimethylhexane (CAS #78-63-7), and a compatibilizing agent, diphenylfulvene (CAS #2175-90-8), such that the molar ratio of peroxide bonds (O—O) to compatibilizing agent in the composition was 1:1. Each of the Samples A-D was mixed, extruded, and injection molded according to the procedure described above. The bars were then subjected to melt flow rate and Izod impact testing described above. The number-average sequence length for ethylene for each heterophasic polymer composition (prior to treatment with the compatibilizing agent) was determined using $^{13}$C NMR according to the methods described above.

TABLE 1

Impact and melt flow rate changes for modified heterophasic polypropylene impact copolymer compositions.

| | Sample 1A | Sample 1B | Sample 1C | Sample 1D |
|---|---|---|---|---|
| Number-average Sequence Length of Ethylene ($n_E$) | 4 | 3 | 3 | 3 |
| Loading of Compatibilizing Agent (ppm) | 792 | 1189 | 1189 | 1189 |
| Untreated MFR (g/10 min at 230° C.) | 18 | 19 | 4 | 7 |
| Treated MFR (g/10 min at 230° C.) | 31 | 44 | 10 | 25 |
| Untreated Impact Strength (kJ/m$^2$) | 11 | 11.2 | 11.7 | 11.8 |
| Treated Impact Strength (kJ/m$^2$) | Non-break | 13.6 | 11.7 | 8.6 |

The resulting changes in the impact strength shown in Table 1 show that when the number-average sequence length of ethylene in the heterophasic polypropylene impact copolymer is approximately 3, the compatibilizing agent achieves relatively modest gains in the impact/MFR balance as shown in Samples 1B, 1C and 1D. Surprisingly, when the number-average sequence length of ethylene in the heterophasic polypropylene impact copolymer is 4, the compatibilizing agent produces a large gain in the impact strength while the MFR is increased. The large gain was observed even though the compatibilizing agent was used at a reduced loading, as shown in Sample 1A. When modified with the compatibilizing agent, Sample 1A has significantly increased MFR relative to the untreated resin and its impact strength has changed from complete breaks at 13.6 kJ/m$^2$ to a more ductile non-break behavior, which is desirable. The stiffness of the modified resins was not significantly changed from the unmodified resins.

Example 2

The following example demonstrates the effect of the relative mol. % of ethylene triads in a heterophasic polyolefin composition in the context of the method of the present invention.

Six heterophasic polymer compositions were produced, Samples 2A-2D from two different polypropylene impact copolymers, Resin 2-1 and Resin 2-2. Samples 2A and 2B were created by mixing either Resin 2-1 or Resin 2-2 with a peroxide, 2,5-Bis(tert-butylperoxy)-2,5-dimethylhexane (CAS #78-63-7), and a compatibilizing agent, 2-(2-Furylmethylene)malononitrile (CAS #3237-22-7), such that the molar ratio of peroxide bonds (O—O) to compatibilizing agent in the composition was 0.5:1. Samples 2C and 2D were created by mixing either Resin 2-1 or Resin 2-2 with a peroxide, 2,5-Bis(tert-butylperoxy)-2,5-dimethylhexane (CAS #78-63-7, Luperox 101), and a compatibilizing agent, TEMPO-methacrylate (CAS #15051-46-4), such that the molar ratio of peroxide bonds (O—O) to compatibilizing agent in the composition was 2:1. Compositions for Samples 2A-2D are shown in Table 2. Comparative examples (Comp.

2A and Comp. 2B) consisting of unmodified Resin 2-1 and unmodified Resin 2-2 are also shown in table 2.

TABLE 2

Compositions of Samples 2A-2D and Comparative Examples 2A and 2B

|  | Resin 2-1 | Resin 2-2 | Peroxide | Loading of Compatibilizing Agent |
|---|---|---|---|---|
| Comp. 2A | Balance | — | — | — |
| Comp. 2B | — | Balance | — | — |
| Sample 2A | Balance | — | 1000 ppm | 1984 ppm |
| Sample 2B | — | Balance | 1000 ppm | 1984 ppm |
| Sample 2C | Balance | — | 1000 ppm | 828 ppm |
| Sample 2D | — | Balance | 1000 ppm | 828 ppm |

Each of Samples 2A-2D was mixed, extruded, and injection molded according to the procedure described above. The bars were then subjected to melt flow rate and Izod impact testing as described above. Samples were fractionated using temperature rising elution fractionation (TREF) and the relative mol. % ethylene triads (% EEE) in each fraction was determined using $^{13}$C NMR according to the methods described above. The % EEE for the resin fractions are shown in Table 3. The impact and MFR rate performance of Comp. 2A, Comp. 2B, and Samples 2A-2D are shown in Table 4.

TABLE 3

The % EEE in the TREF fractions of Resin 2-1 and Resin 2-2

|  | Bulk Resin | 30° C. Fraction | 60° C. Fraction | 80° C. Fraction | 100° C. Fraction |
|---|---|---|---|---|---|
| Resin 2-1 | 9 | 24 | 51 | 52 | 24 |
| Resin 2-2 | 8 | 20 | 40 | 46 | 11 |

TABLE 4

The impact and melt flow rate performance of Comp. 2A, Comp. 2B, and Samples 2A-2D

|  | Melt Flow Rate (g/10 min at 230° C.) | Impact Strength (J/m) |
|---|---|---|
| Comp. 2A | 18 | 95 |
| Comp. 2B | 21 | 99 |
| Sample 2A | 31 | NB |
| Sample 2B | 43 | 121 |
| Sample 2C | 46 | 116 |
| Sample 2D | 51 | 105 |

The results in Table 4 show that untreated Resin 2-1 and Resin 2-2 exhibit similar physical properties. However, the data in Table 3 show that the two resins different in terms of chemical composition or polymer structure. In particular, the data in Table 3 show that Resin 2-1 contained greater amounts of ethylene in ethylene triads as compared to Resin 2-2. For example, some fractions of Resin 2-1 contained 10 mol. % or more ethylene in ethylene triads than the corresponding fractions from Resin 2-2. The data in Table 4 then illustrates the effects of these differences in chemical or polymer structure. The data in Table 4 show that while the melt flow rate was increased in both Resin 2-1 and Resin 2-2 when treated using the inventive method (as shown by Samples 2A and 2B), the increase in impact strength achieved in Resin 2-1 was surprisingly high as compared to Resin 2-2. In particular, the resin showed an impact improvement from 95 J/m complete breaks to non-break behavior (see, Sample 2A). This behavior contrasts with Sample 2B (containing modified Resin 2-2) in which the impact strength rises from 99 J/m complete breaks to 121 J/m and remains complete break failures. This differential performance is surprising given the physical similarities between the two polymers.

Example 3

The following example illustrates the influence of increasing the percentage of ethylene triads and the number average sequence length of ethylene in a heterophasic polypropylene composition in the context of the method of the present invention.

Eight heterophasic polymer compositions were produced. Comparative Sample 3A (Comp. 3A) was an unmodified heterophasic polypropylene impact copolymer ("ICP" in Table 5) with a number average sequence length for ethylene of 3 as determined using $^{13}$CNMR as described above. Comparative Sample 3B (Comp. 3B) was made by compounding the same unmodified heterophasic polypropylene impact copolymer with a small amount of a high density polyethylene polymer ("HDPE" in Table 5). Comparative Sample 3C was made by compounding the same heterophasic polypropylene impact copolymer with the high density polyethylene polymer and a peroxide, namely 2,5-Bis(tert-butylperoxy)-2,5-dimethylhexane (CAS #78-63-7). Comparative Sample 3D was made by compounding the same heterophasic polypropylene impact copolymer with a peroxide (namely, 2,5-Bis(tert-butylperoxy)-2,5-dimethylhexane (CAS #78-63-7)), and a compatibilizing agent (namely, TEMPO-methacrylate (CAS #15051-46-4)). Samples 3E-3H were made by compounding the same heterophasic polypropylene impact copolymer with a small amount of a polyethylene resin (a high density polyethylene polymer ("HDPE"), a low density polyethylene polymer ("LDPE"), a linear low density polyethylene polymer ("LLDPE"), and an ethylene/α-olefin elastomer impact modifier ("EIM")), a peroxide (namely, 2,5-Bis(tert-butylperoxy)-2,5-dimethylhexane (CAS #78-63-7)), and a compatibilizing agent (namely, TEMPO-methacrylate (CAS #15051-46-4)). The formulation for these samples is set forth in Table 5.

TABLE 5

Compositions of Comparatives Comp. 3A-3C and Samples 3E-3H.

|  | ICP | Peroxide (ppm) | Compatibilizing Agent (ppm) | HDPE (wt. %) | LDPE (wt. %) | LLDPE (wt. %) | EIM (wt. %) |
|---|---|---|---|---|---|---|---|
| 3A | Balance | — | — | — | — | — | — |
| 3B | Balance | — | — | 2 | — | — | — |
| 3C | Balance | 1,000 | — | 2 | — | — | — |
| 3D | Balance | 1,000 | 1,660 | — | — | — | — |
| 3E | Balance | 1,000 | 1,660 | 2 | — | — | — |
| 3F | Balance | 1,000 | 1,660 | — | 2 | — | — |
| 3G | Balance | 1,000 | 1,660 | — | — | 2 | — |
| 3H | Balance | 1,000 | 1,660 | — | — | — | 2 |

Each of the compositions listed in Table 5 was mixed, extruded, and injection molded according to the procedure described above. The bars were then subjected to melt flow rate and Izod impact testing as described above.

TABLE 6

Melt flow rate and impact strength
for Comp. 3A-3D and Samples 3E-3H.

| | Melt Flow Rate (g/10 min at 230° C.) | RT Notched Impact Strength (kJ/m²) |
|---|---|---|
| Comp. 3A | 22 | 10.1 |
| Comp. 3B | 21 | 11.34 |
| Comp. 3C | 66 | 7.7 |
| Comp. 3D | 38 | 10.6 |
| Sample 3E | 38 | 21.6 |
| Sample 3F | 32 | 37.6 |
| Sample 3G | 31 | 39.8 |
| Sample 3H | 31 | 39.0 |

The results in Table 6 show that Comp. 3A, which is an unmodified heterophasic polypropylene impact copolymer with a number-average sequence length for ethylene of 3, shows a low level of improvement in impact strength when treated according to the method of the invention (see, Comp. 3D). This behavior is believed to be attributable to the lower number-average sequence length for ethylene in the impact copolymer. The addition of high density polyethylene, which would serve to increase the number-average sequence length for ethylene in the overall composition, does not by itself improve the impact strength significantly when done with or without peroxide vis-breaking (see, Comp. 3B and 3C). However, when the impact copolymer is doped with a polyethylene polymer and processed according to the method of the invention, the composition showed significant improvements in the impact strength. This is illustrated by the impact strength measurements for Samples 3E-3H as compared to Comp. 3D. The results are believed to illustrate the importance of the number-average sequence length for ethylene (i.e., the compositions with an increased number-average sequence length exhibited greater increases in impact strength). The results are also believed to illustrate a method by which one could modify a given polymer composition in order to yield greater improvements in the impact strength.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A method for modifying a heterophasic polymer composition, the method comprising the steps of:
    (a) providing a compatibilizing agent, the compatibilizing agent comprising two or more functional groups capable of reacting with a free radical in a radical addition reaction;
    (b) providing a heterophasic polymer composition, the heterophasic polymer composition comprising a propylene polymer phase and an ethylene polymer phase, and the heterophasic polymer composition having a number-average sequence length of ethylene runs of 3 or more;
    (c) mixing the compatibilizing agent and the heterophasic polymer composition; and
    (d) generating free radicals in the propylene polymer phase and the ethylene polymer phase, whereby at least a portion of the compatibilizing agent reacts with free radicals in both the propylene polymer phase and the ethylene polymer phase to form a bond with a propylene polymer in the propylene polymer phase and a bond with an ethylene polymer in the ethylene polymer phase.

2. The method of claim 1, wherein the heterophasic polymer composition comprises about 6 wt. % or more ethylene based on the total weight of the heterophasic polymer composition.

3. The method of claim 1, wherein the heterophasic polymer composition comprises about 10 wt. % or more xylene solubles.

4. The method of claim 1, wherein about 5 mol. % or more of the ethylene present in the heterophasic polymer composition is present in ethylene triads.

5. The method of claim 1, wherein about 30 mol. % or more of the ethylene present in a 60° C. temperature rising elution fractionation (TREF) fraction of the heterophasic polymer composition is present in ethylene triads.

6. The method of claim 1, wherein about 30 mol. % or more of the ethylene present in an 80° C. temperature rising elution fractionation (TREF) fraction of the heterophasic polymer composition is present in ethylene triads.

7. The method of claim 1, wherein about 5 mol. % or more of the ethylene present in a 100° C. temperature rising elution fractionation (TREF) fraction of the heterophasic polymer composition is present in ethylene triads.

8. The method of claim 1, wherein the number-average sequence length of ethylene runs present in a 60° C. temperature rising elution fractionation (TREF) fraction of the heterophasic polymer composition is 3 or more.

9. The method of claim 1, wherein number-average sequence length of ethylene runs present in an 80° C. temperature rising elution fractionation (TREF) fraction of the heterophasic polymer composition is 7 or more.

10. The method of claim 1, wherein the number-average sequence length of ethylene runs present in a 100° C. temperature rising elution fractionation (TREF) fraction of the heterophasic polymer composition is 10 or more.

* * * * *